(12) United States Patent
Muylaert et al.

(10) Patent No.: US 7,344,108 B2
(45) Date of Patent: Mar. 18, 2008

(54) LANDING ASSIST APPARATUS INTERFACE BULKHEAD AND METHOD OF INSTALLATION

(75) Inventors: Neal W. Muylaert, Apache Junction, AZ (US); Darrin Tebon, Apache Junction, AZ (US); Rolland E. Lahaie, Mesa, AZ (US)

(73) Assignee: The Boeing Company, Chicago, IL (US)

( * ) Notice: Subject to any disclaimer, the term of this patent is extended or adjusted under 35 U.S.C. 154(b) by 196 days.

(21) Appl. No.: 10/860,162

(22) Filed: Jun. 3, 2004

(65) Prior Publication Data

US 2005/0269450 A1 Dec. 8, 2005

(51) Int. Cl.
*B64F 1/12* (2006.01)
(52) U.S. Cl. .................. 244/115; 244/116; 244/119; 244/110 R; 244/110 E
(58) Field of Classification Search ................ 244/115, 244/116, 110 R, 110 E, 110 F, 118.1, 119
See application file for complete search history.

(56) References Cited

U.S. PATENT DOCUMENTS

| | | | | |
|---|---|---|---|---|
| 3,502,286 A | * | 3/1970 | Warren | 244/17.17 |
| 4,318,328 A | * | 3/1982 | Rona | 89/1.815 |
| 5,072,895 A | * | 12/1991 | Camus | 244/118.1 |
| 5,540,402 A | * | 7/1996 | Carducci | 244/118.1 |
| 2005/0017131 A1 | * | 1/2005 | Hale et al. | 244/136 |

OTHER PUBLICATIONS

S-3B SLAP to test prototype SLEP kit; http://www.findarticles.com/p/articles/mi_qa3738/is_1999908/ai_n8858147.*
Eurocopter; http://www.eurocopter.com/site/FO/scripts/siteFO_contenu.php?lang=EN&noeu_id=67.*

* cited by examiner

*Primary Examiner*—J. Woodrow Eldred
(74) *Attorney, Agent, or Firm*—Harness, Dickey & Pierce, P.L.C.

(57) ABSTRACT

An aircraft landing assist apparatus is designed to be retrofit to existing aircraft having internal constructions that have been modified to support the apparatus. The apparatus is designed so that on rough landings of the aircraft on a ship deck, the apparatus will collapse in a controlled manner to avoid any damage to ammunition and/or fuel storage areas of the aircraft.

18 Claims, 26 Drawing Sheets

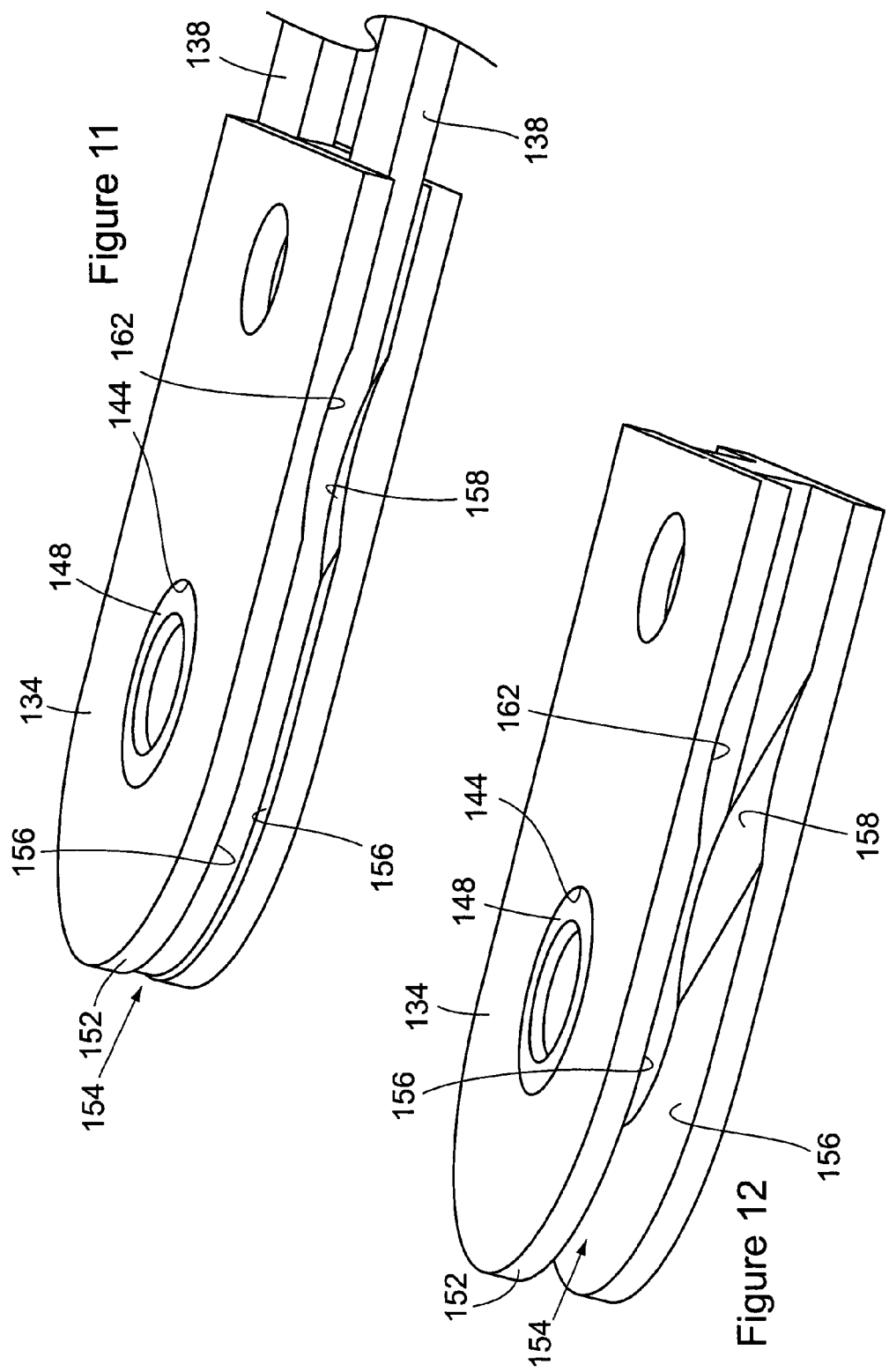

LANDING ASSIST APPARATUS INTERFACE BULKHEAD AND METHOD OF INSTALLATION

This was developed in the course of work under U.S. Government Army Contract DAAH23-99-C-0111. The U.S. government may possess certain rights in the present disclosure.

BACKGROUND (1) Field

The present disclosure pertains to an aircraft landing assist system. More specifically, the present disclosure pertains to a mounting system for an aircraft landing assist probe, and a method of retrofitting an aircraft with the mounting system to adapt that aircraft for landing on a deck of a ship.

(2) Description of the Related Art

Landing assist systems have been developed that facilitate the landing of an aircraft, for example, a helicopter, on the deck of a ship. An example of one such system is the aircraft/ship integrated secure and traverse (ASIST) deck landing system developed by Indal Technologies, Inc. of Ontario, Canada.

In a typical aircraft landing assist apparatus employed in landing a helicopter on the deck of a ship, the helicopter is provided with a landing probe. The landing probe is positioned on an underside of an aircraft and projects downwardly from the aircraft to a distal end of the probe.

A rapid securing device is provided on the deck of the ship. The rapid securing device includes a track on the ship deck and a cart mounted on the track for sliding movement of the cart along the track. The cart is provided with a securing latch that is removably attachable to the probe distal end.

In landing a helicopter on the deck of a ship using the aircraft landing assist system, the helicopter approaches the ship deck when the pitching motion of the ship is relatively tranquil. As the helicopter descends toward the ship deck, the cart moves along the track, following the movement of the helicopter over the ship deck toward a predetermined landing area. On touchdown of the helicopter landing gear on the deck landing area, the landing probe of the helicopter is received and secured by the latch of the cart, securing the helicopter to the ship deck. With the helicopter secured to the ship deck, the cart can then be moved across the deck to move the helicopter to a hangar.

Helicopters that are designed for ship deck landings are equipped with landing assist probes. When this type of helicopter is constructed, the structural frame of the helicopter is matched to the landing assist probe to provide sufficient structural strength to the probe. This matching of the structural frame of the helicopter with the landing assist probe is necessary because on a pitching and rolling ship deck, there is a great deal of tension on the probe as it holds the helicopter down on the deck. Helicopters by design are top heavy with the rotor assembly and the power unit being positioned in the upper area of the helicopter's structural frame. Thus, known aircraft/ship landing assist systems employ helicopters that have structural frames specifically designed for the landing assist probe that secures the helicopter to the ship deck.

The prior art aircraft/ship landing assist systems are therefore disadvantaged in that the system are limited to use with helicopters that are dedicated for use with the landing assist system. In the construction of these dedicated helicopters, a primary design consideration is providing the helicopter with a structural frame that is secured to the landing assist probe to facilitate shipboard landings of the helicopter. These specifically designed helicopters may be lacking in other desirable features for helicopters, for example the various different types of weaponry available on modern day military aircraft. What is needed to overcome this disadvantage of aircraft/ship landing assist systems is an aircraft landing assist apparatus that can be retrofit to existing aircraft to adapt these aircraft for shipboard operation.

SUMMARY

The present disclosure overcomes disadvantages of the prior art by providing an aircraft landing assist apparatus that is specifically designed to be retrofit to existing aircraft that have not previously been designed for shipboard landings. In addition, on rough landing of an aircraft using the apparatus, the apparatus is designed to collapse in a controlled manner beneath the aircraft, thereby avoiding any damage to ammunition and/or fuel storage areas of the aircraft, and preventing the transfer of the vertical loads due to impact to the pilot and/or copilot.

The apparatus basically comprises a landing probe assembly that is secured to the underside of an aircraft, preferably a helicopter. Prior to the installation of the landing probe assembly, the internal structure of the helicopter is modified to provide sufficient structural strength to the helicopter for landing the helicopter on the deck of a ship and securing the helicopter to the deck of the ship through the landing probe.

In the method of modifying the aircraft, a fuselage panel on the underside of the aircraft is first removed, exposing an interior bay of the aircraft. The interior bay has a forward bulkhead wall and a rearward bulkhead wall at opposite ends of the bay. In military helicopter aircraft the bay houses an ammunition container. Removal of the fuselage bottom panel exposes the ammunition container in the bay. The ammunition container is removed, providing access to the forward and rearward bulkhead walls in the bay.

To provide sufficient structural strength to the aircraft structure to facilitate use of the aircraft landing assist apparatus, both the forward bulkhead wall and rearward bulkhead walls are removed and replaced by reinforced bulkhead walls. The reinforced bulkhead walls provide sufficient structural strength to the helicopter frame to support the rotor assembly and power unit of the aircraft, as well as support the landing assist apparatus of the disclosure.

With the reinforced forward and rearward bulkhead walls installed in the aircraft at opposite sides of the interior bay, the ammunition container is reinstalled in the bay. The bottom fuselage panel is then reinstalled on the underside of the aircraft, enclosing the ammunition container inside the bay. The aircraft landing assist apparatus of the disclosure is basically comprised of a landing probe that is suspended from an underside of the helicopter by a base that is connected to the helicopter. A plurality of stabilizing struts extend between the probe and the base. The struts hold the probe in a position where the probe extends downwardly and slightly forwardly from a central portion of the base.

The base of the landing assist apparatus is connected to the underside of the aircraft. The base has a general X-shaped configuration, with a base central portion and four radiating arms. Distal ends of two of the arms are secured to the forward reinforced bulkhead and distal ends of the remaining two arms are secured to the rearward reinforced bulkhead. Thus, the apparatus is basically supported from the same internal construction of the aircraft that receives the loads when the aircraft is flying.

The landing probe of the apparatus is a telescoping probe having opposite proximal and distal ends. The distal end of the probe retracts relative to the proximal end of the probe when a compressive force is exerted on the probe distal end.

The probe proximal end is connected to the central portion of the base for movement of the probe relative to the base. In an embodiment, the probe proximal end is provided with a connector having perpendicular pivot shafts that enable pivoting movement of the probe in two perpendicular planes about two perpendicular axes. One of the pivot shaft ends is provided with a journal having a smaller cross section diameter than the remaining three journals of the pivot shafts. Should an excessive compressive force due to a rough landing be exerted against the probe distal end causing complete retraction of the probe distal end relative to the proximal end and exerting a compressive force on the probe proximal end, the small diameter journal wall first fail, causing the probe to collapse beneath the base and preventing the probe from being pushed upwardly through the center of the helicopter fuselage bottom panel and into the ammunition container in the helicopter bay.

The four stabilizing struts extending between the base and the probe hold the probe in its downwardly extending position. The strut resist movement of the probe when a compressive force on the probe exerts a tensile force on the struts. The struts are specifically designed to collapse when a compressive force is exerted on the struts, thereby providing no resistance of movement of the probe that exerts a compressive force on the struts. In this manner, the movement of the probe is controlled when an excessive impact force is exerted on the probe due to a hard landing of the helicopter on the ship deck. The controlled movement of the probe prevents the probe proximal end from piercing the bottom fuselage panel of the helicopter and potentially entering into the ammunition container or a fuel cells.

Different embodiments of the stabilizing struts are employed on the landing assist apparatus. In one embodiment, each strut is comprised of a plurality of links connected end to end by pivot connectors. The lengths of each strut limit movement of the probe when the probe movement exerts a tensile force on the strut, but each strut is designed to collapse and permit movement of the probe when the probe movement exerts a compressive force on the strut.

Some of the strut links include pivot connections having an eccentric bushing. The eccentric bushing can be rotated relative to the strut link to adjust the overall length of the strut.

In a further embodiment of the stabilizing struts, each strut includes bands constructed of composite materials. The bands are looped around proximal and distal end connectors at the opposite proximal and distal ends of the strut. The proximal end connector connects the strut to the apparatus base, and the distal end connector connects the strut to the probe. The composite material of the strut bands resist movement of the probe when the probe movement exerts a tensile force on the bands, but bends and permits movement of the probe when the probe movement exerts a compressive force on the bands.

The distal ends of the stabilizing struts are operatively connected to the probe by a slip ring. The slip ring is mounted on the probe for movement of the slip ring along the probe length in response to a predetermined amount of movement of the probe distal end relative to the probe proximal end. This enables the slip ring to move relative to the probe in response to a significant impact of the probe distal end with a ship deck on a rough landing of the helicopter. The movement of the slip ring controls the collapse of the stabilizer struts and the movement of the probe in response to the impact.

The slip ring is provided with a lock mechanism that holds the slip ring stationary relative to the probe with the probe proximal and distal ends in their extended positions. On impact of the probe distal end with the ship deck, the slip ring continues to hold the stabilizer strut distal ends stationary relative to the probe for a predetermined movement of the probe distal end relative to the probe proximal end. The tension on the struts maintains the position of the probe relative to the helicopter. When movement of the probe distal end relative to the probe proximal end exceeds the predetermined amount of movement, the lock mechanism of the ring is released and the ring, as well as the attached stabilizer strut distal ends, are free to move along the length of the probe to control the collapse of the probe beneath the helicopter.

The aircraft landing assist apparatus of the disclosure described above enables existing helicopters to be retrofit with the apparatus, adapting the helicopters for shipboard landings. The apparatus is also constructed whereby it will controllably collapse in response to an excessive impact of the apparatus with a ship deck on rough landing of the helicopter, thereby avoiding potentially catastrophic damage to the helicopter.

BRIEF DESCRIPTION OF THE DRAWINGS

Further features of the present disclosure are set forth in the following detailed description, and in the drawing figures wherein:

FIG. 11 is a partial view of an end connector of the stabilizing strut of FIG. 10;

FIG. 12 is a view of the end connector removed from the stabilizing strut;

DETAILED DESCRIPTION

Figure 1:
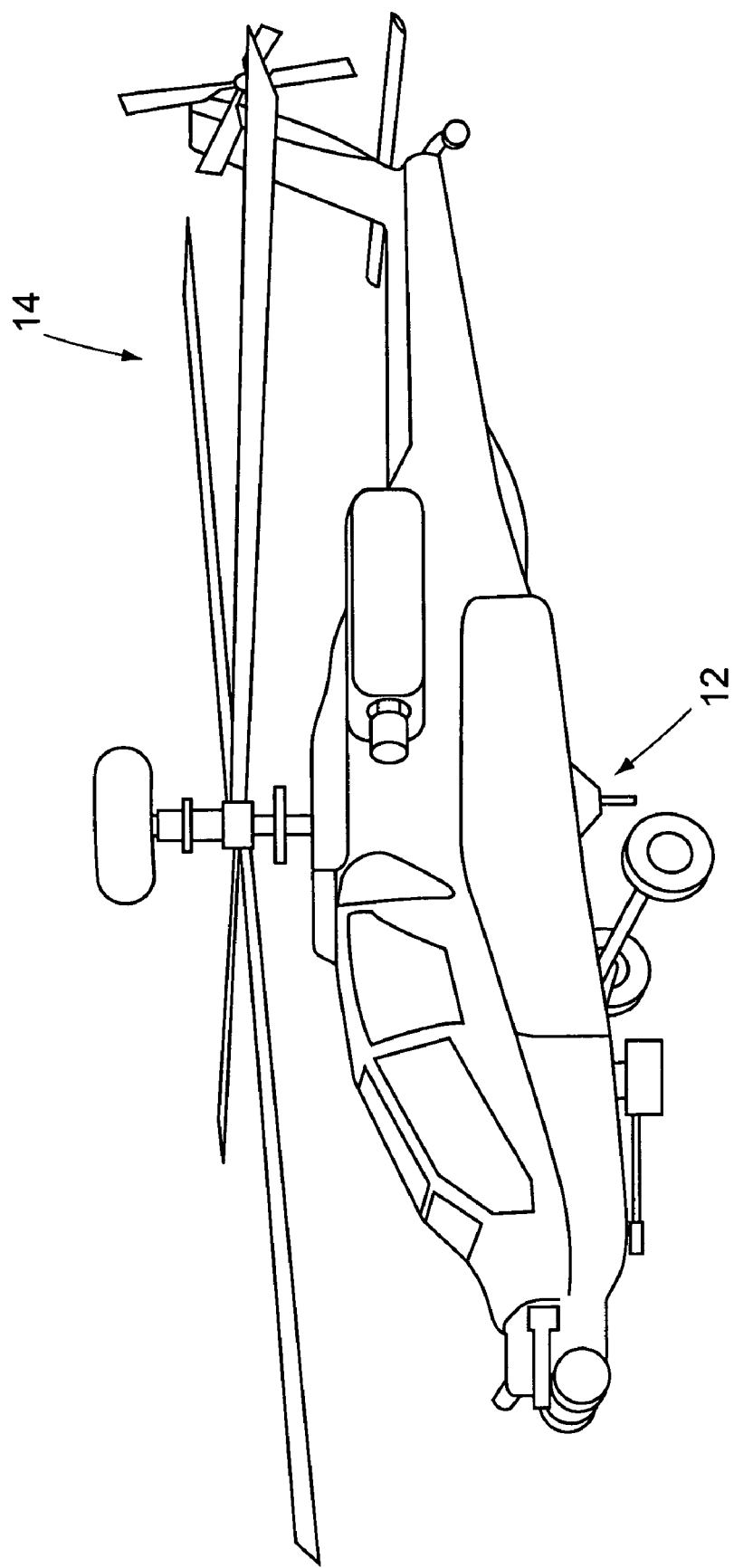
FIG. 1 is a view of one example of a helicopter aircraft retrofit with the landing assist apparatus of the disclosure.

FIG. 1 shows the aircraft landing assist apparatus 12 of the disclosure employed on an aircraft 14. Specifically, FIG. 1 shows the apparatus 12 installed on the underside of a helicopter-type aircraft, for example an AH64 Apache helicopter. It should be understood that the particular type of aircraft 14 with which the apparatus 12 is shown in FIG. 1 is illustrative only. It is not intended that the apparatus 12 be limited to use with any one particular type of aircraft.

The apparatus 12 is specifically designed to be retrofit to existing helicopters that have not previously been designed for shipboard landings. In addition, on rough landing of the aircraft using the apparatus 12, the apparatus is designed to collapse in a controlled manner beneath the aircraft 14, thereby avoiding any damage to internal components of the aircraft such as an ammunition container and/or a fuel storage cell. Although an embodiment of the apparatus is retrofit to an existing aircraft, the apparatus may also be made an integral part of the aircraft as the aircraft is initially assembled.

Prior to the installation of the landing assist apparatus 12 on the underside of the aircraft 14, the internal structure of the aircraft is modified. The modifications provide sufficient structural strength to the aircraft for landing the aircraft on the deck of a ship and for latching the aircraft to the ship deck using a conventional deck landing system such as the aircraft/ship integrated secure and traverse (ASIST) system produced by Indal Technologies, Inc. of Ontario, Canada. The method of modifying the structure of the aircraft in order to retrofit the landing assist apparatus is also a part of the present disclosure.

Figure 2:
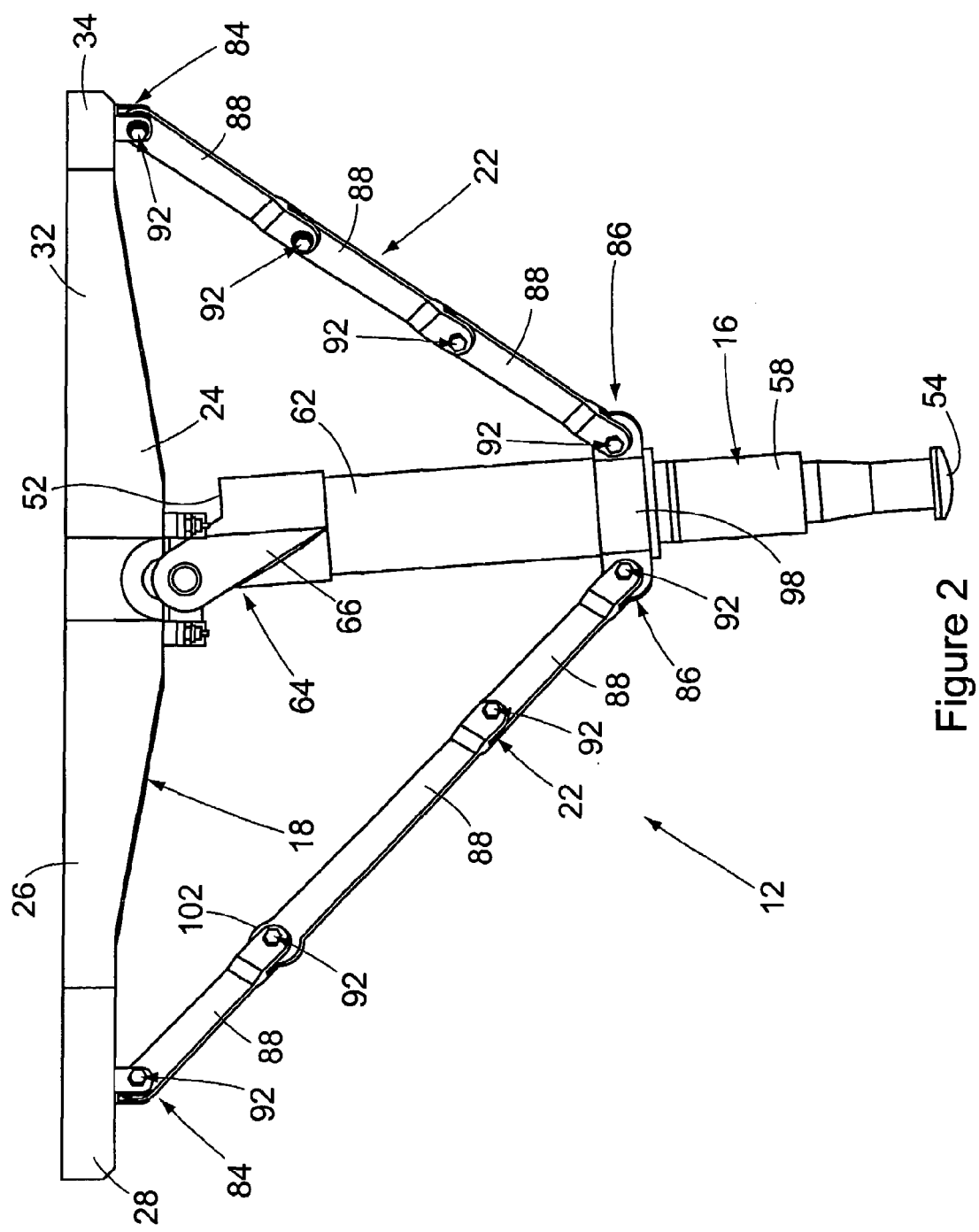
FIG. 2 is a side elevation view of the landing assist apparatus removed from the aircraft.
Figure 3:
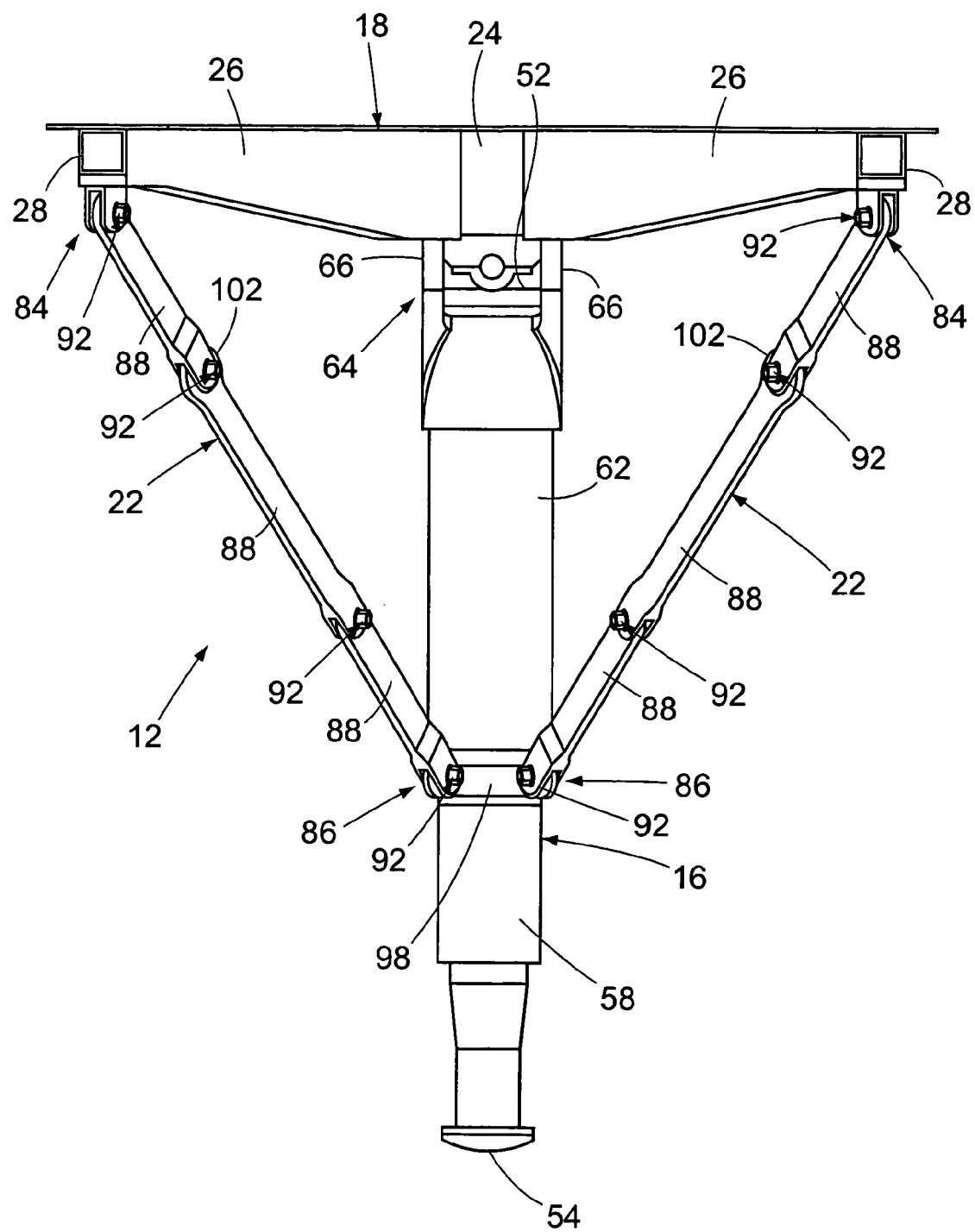
FIG. 3 is a front elevation view of the apparatus.

FIGS. 2 and 3 show the construction of the aircraft landing assist apparatus 12 removed from the underside of the aircraft 14 shown in FIG. 1. The apparatus 12 is basically comprised of a landing probe 16 that is suspended from a base 18 that is connected to the underside of the aircraft. A plurality of stabilizing struts 22 extends between the probe and the base. The struts 22 restrain movement of the probe 16 and hold the probe in a position extending downwardly and slightly forwardly from the aircraft.

APPARATUS BASE

Figure 4:
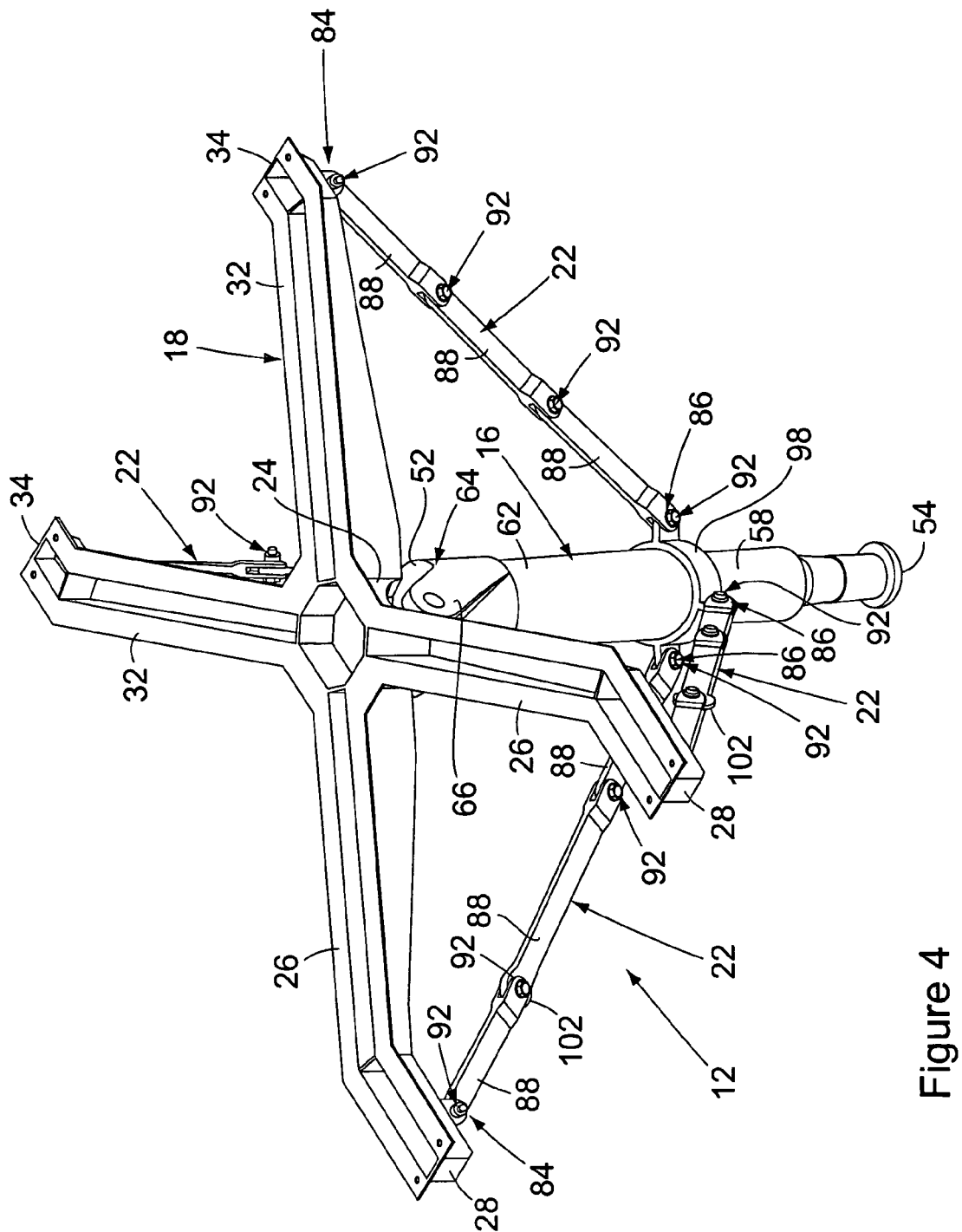
FIG. 4 is a top perspective view of the apparatus employing a first embodiment of stabilizing struts.
Figure 5:
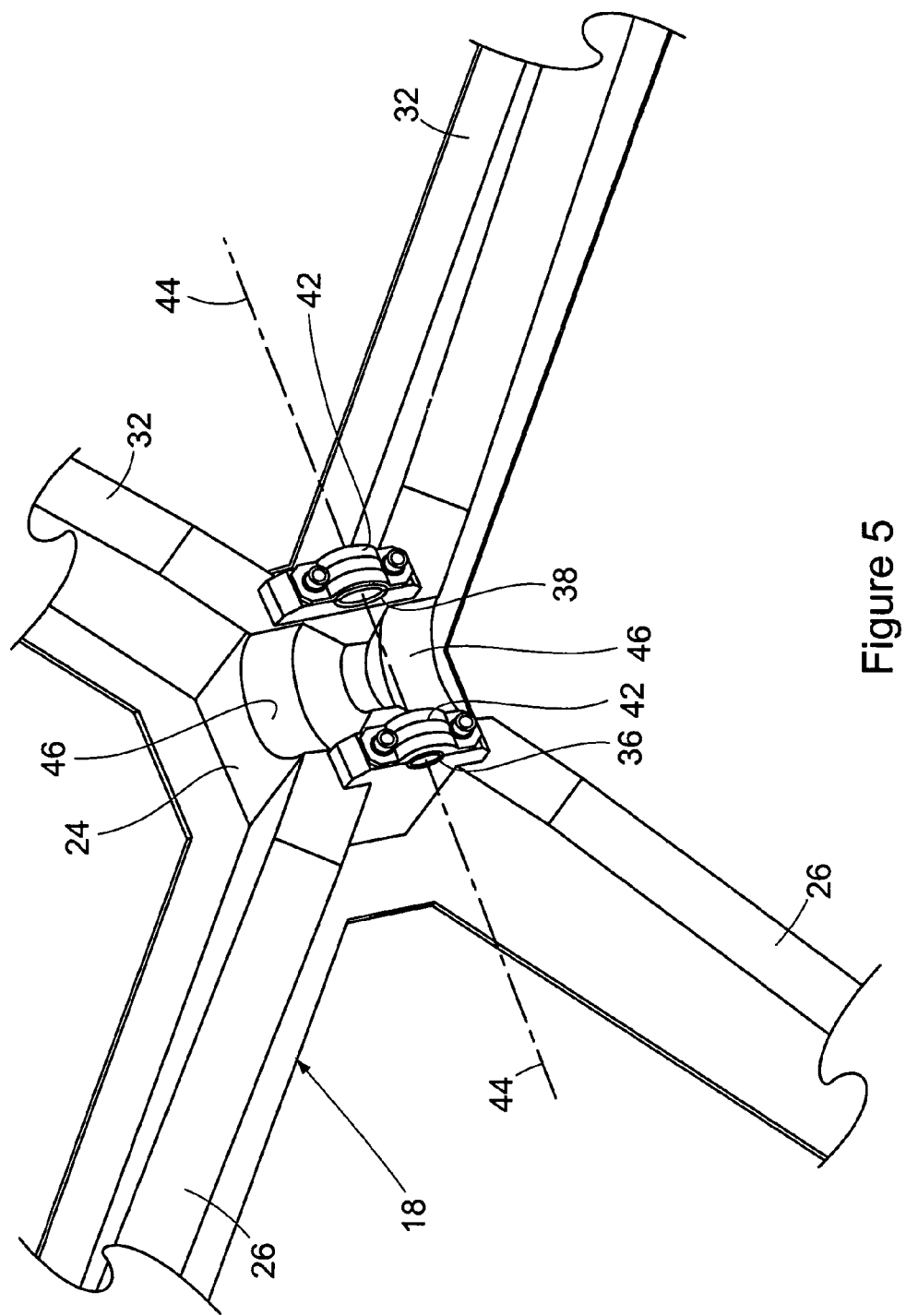
FIG. 5 is a partial view of the apparatus base.

FIGS. 2-5 show the construction of the base 18 of the apparatus. The base 18, as well as the other structural parts of the apparatus, are constructed of metals or composite materials typically used in the construction of aircraft. As best seen in FIGS. 4 and 5, the base has a general X-shape with a central portion 24 and four arms that radiate outwardly from the central portion. Each of the arms 26, 32 is formed with a U-shaped cross section, which provides structural strength to the arms, yet will crush to absorb excessive impact loads. Two of the arms 26 extend forwardly from the base central portion 24 to distal ends 28 of the forward arms. Two of the arms 32 extend rearwardly from the base central portion 24 to distal ends 34 of the rearward arms. As best seen in FIG. 4, the arm distal ends 28, 34 are spatially arranged around the base central portion 24 and are positioned in a polygonally pattern around the base central portion. Each of the arm distal ends 28, 34 are adapted for connection to the underside of the aircraft 14.

The underside of the base central portion 24 is shown in FIG. 5. A forward bearing assembly 36 and a rearward bearing assembly 38 are secured to the base central portion 24 by a pair of clamps 42. The forward bearing assembly 36 and the rearward bearing assembly 38 have a common center axis 44, that is aligned with a center axis (not shown) of the aircraft 14. The forward bearing assembly 36 has a slightly smaller interior diameter than the rearward bearing assembly 38. Thus, the forward bearing assembly 36 receives a smaller journal than the rearward bearing assembly 38, as will be explained.

A pair of semicylindric recesses 46 are formed into the base central portion 24. The recesses 46 have a common center axis (not shown) that is perpendicular to the bearing assembly center axis 44. The recesses 46 provide clearance in the base central position for movement of the probe 16 beneath the base 18, as will be explained.

APPARATUS PROBE

Figure 6:
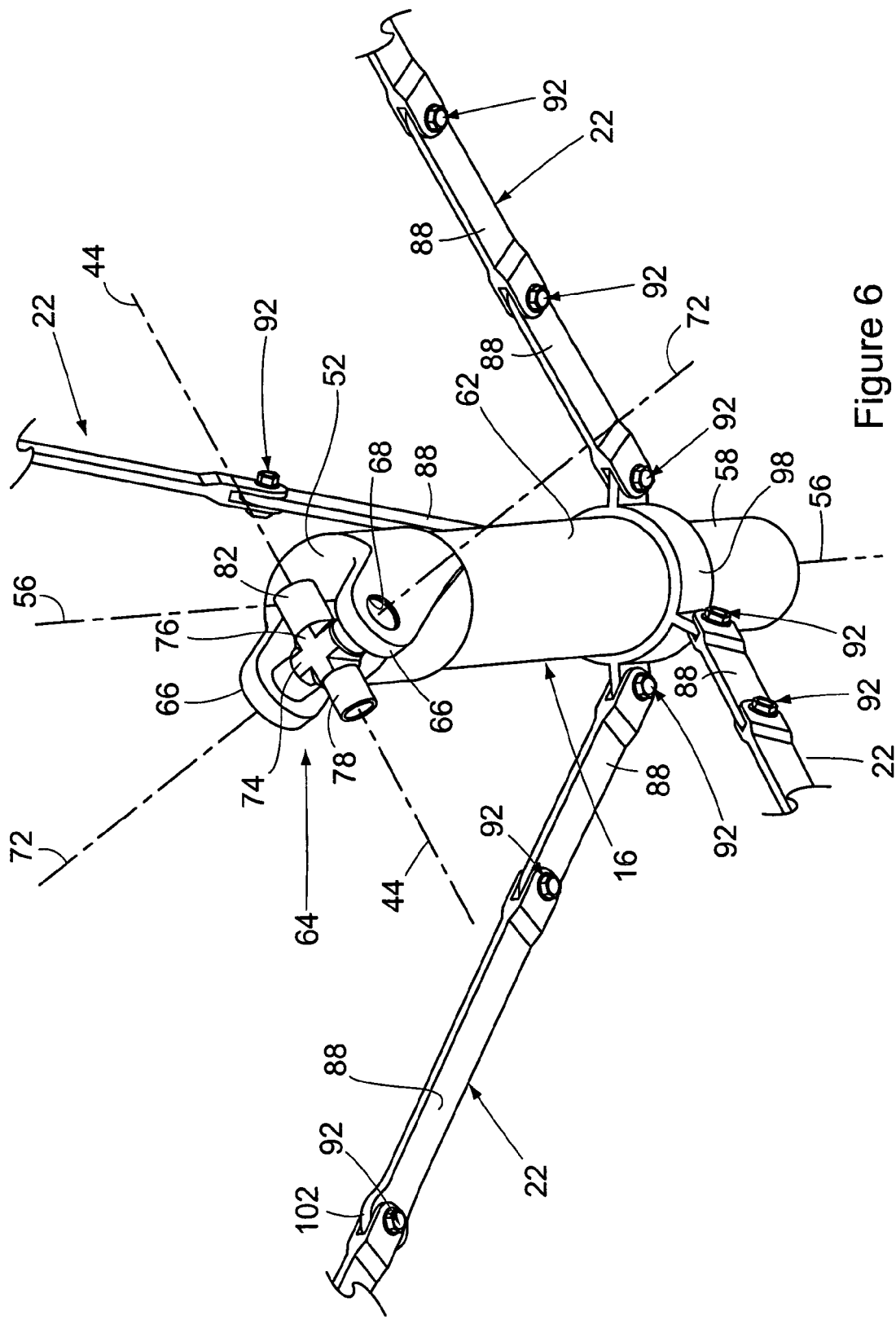
FIG. 6 is a partial view of the apparatus probe shown removed from the apparatus base.

FIGS. 2-4 show the landing assist probe 16 depending from the base 18, and FIG. 6 shows the landing probe 16 removed from the base. The probe 16 has a cylindrical length that extends between opposite proximal 52 and distal 54 ends of the probe. The cylindrical configuration of the probe 16 has a center axis 56 that defines mutually perpendicular axial and radial directions relative to the probe. The construction of the probe 16, for the most part, is the same as that of conventional probes employed in landing assist systems such as the ASIST system. The probe distal end 54 is adapted for being latched by a latching mechanism of a landing assist system. The probe proximal end 52 is adapted for connection to the underside of an aircraft. A distal portion 58 of the probe is telescopically received in a proximal portion 62 of the probe. This enables telescoping, reciprocating movement of the probe distal portion 58 into the probe proximal portion 62 in response to a compressive force being exerted on the probe distal end 54 during landing operations.

A spring assembly or shock absorbing assembly (not shown) is contained inside the interior of the probe 16 and biases the probe distal end portion 58 toward an extended position relative to the probe proximal portion 62, as is conventional. The spring assembly or shock absorber assembly contained in the probe 16 resists or is biased against the movement of the probe distal end portion 58 toward the probe proximal end portion 62 in response to an impact or compressive force being exerted on the probe distal end 54.

A probe connector assembly 64 connects the probe proximal end 52 to the base central portion 24 for movement of the probe 16 relative to the base 18. As shown in FIG. 6, the connector assembly 64 includes a pair of flanges 66 that are secured stationary to opposite sides of the probe proximal end 52. The flanges 66 project both axially and radially from the probe proximal end and are oriented at an angle relative to the probe center axis 56. Each of the flanges 66 has a shaft hole 68. The shaft holes 68 have a common center axis 72 that is perpendicular to the probe center axis 56, but is offset from the probe center axis 56. The angled orientation of the flanges 66 positions the flange hole axis 72 forwardly of the probe center axis 56, as best seen in FIG. 6.

The probe connector assembly 64 also includes a cross shaft assembly having a first shaft 74 that intersects a second shaft 76. The first shaft 74 has opposite ends that are mounted by bearing assemblies in the probe flange holes 68. This enables the landing probe 16 to pivot in a radial plane about the flange hole axis 72. As best seen in FIG. 6, a forward shaft end 78 of the cross shaft assembly second shaft 78 has a smaller diameter dimension than a rearward shaft end 82 of the cross shaft assembly second shaft. The second shaft forward end 78 is received in the forward bearing assembly 36 of the base, and the second shaft rearward end 82 is received in the rearward bearing assembly 38 of the base. This enables the probe 16 to pivot in a radial plane about the center axis 44 of the bearing assemblies. The connection provided by the connector assembly 64 between the probe 16 and the base 18 shown in FIGS. 2, 3, and 4 enables the probe 16 to pivot through two mutually perpendicular radial planes about the bearing assemblies center axis 44 and the probe flange holes center axis 72 relative to the apparatus base 18.

The smaller diameter of the cross shaft assembly second shaft forward end 78 allows this end of the shaft to fail first when an excessive force is exerted on the probe 16 due to a rough landing of the aircraft. The collapse of the cross shaft assembly second shaft forward end 78 causes a controlled collapse of the probe 16 beneath the aircraft, with the probe moving forwardly relative to the aircraft, which prevents the probe proximal end 52 from being pushed upwardly through the center of the aircraft fuselage on an excessively hard landing of the aircraft.

APPARATUS STRUTS

Each of the struts 22 shown in FIGS. 2, 3, 4, and 6 has a length with opposite proximal 84 and distal 86 ends. Each of the struts 22 is comprised of a plurality of elongate links 88 that are substantially similar in construction. Each of the links 88 is connected, end to end by a pivot pin connection 92. The pivot pin connection 92 is provided by a nut and bolt and bushing assembly that connects adjacent links. The proximal ends 84 of the two forward struts 22 are connected to the distal ends 28 of the base forward arms 26 by pivot connections 92. The proximal ends 84 of the rearward pair of struts 22 are connected to the distal ends 34 of the base rearward arms 32 by pivot connections 92. With the base 18 connected to an aircraft, this provides an operative connection of each of the strut proximal ends 84 to the aircraft.

Each of the strut distal ends 86 is connected to the probe 16 by a pivot connection 19 between the strut distal end and a slip ring 98. The slip ring 98 is mounted to the probe 16 for sliding movement of the slip ring along the probe length.

As best seen in FIG. 2, the slip ring 98 is mounted to the probe proximal end portion 62.

Figure 7:
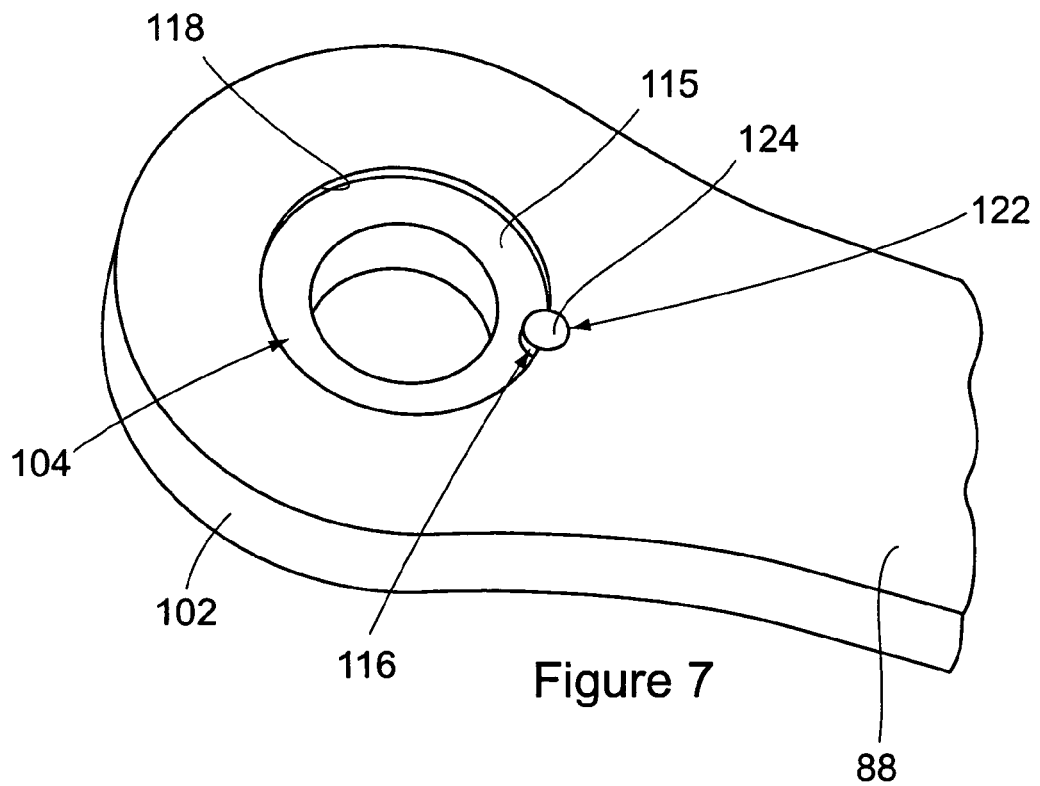
FIG. 7 is a partial view of an end of a strut link shown in FIG. 4.
Figure 8:
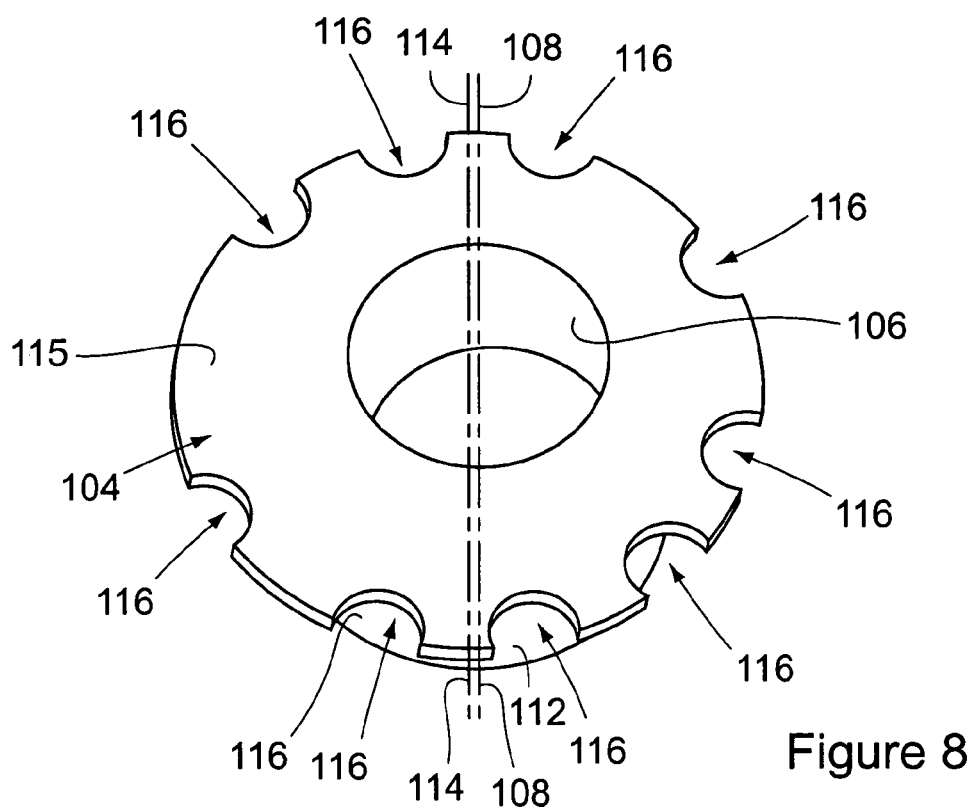
FIG. 8 is a view of an eccentric bushing removed from the strut link of FIG. 7.

As best seen in FIGS. 2 and 3, each of the forward struts 22 has a link with an enlarged pivot end 102. The enlarged pivot end 102 of the link provides the link with sufficient structural strength to mount an eccentric bushing assembly shown in FIGS. 7 and 8.

APPARATUS ECCENTRIC BUSHING

The eccentric bushing assembly includes a cylindrical bushing 102 having a circular center hole 106 that receives the pivot connection 92 between adjacent links of the struts. The bushing center hole 106 has a center axis 108. The bushing has an cylindrical exterior surface 112 that is eccentric to the cylindrical interior surface of the center hole 106. A center axis 114 of the bushing exterior surface 112 is parallel to, but offset from the center axis 108 of the bushing center hole 106. A circular flange 115 projects outwardly from the bushing exterior surface 112. A plurality of semi-cylindric notches 116 are provided in the bushing flange 115 and are spatially arranged around the bushing.

The link enlarged pivot end 102 is provided with a cylindrical through hole 118 that receives the eccentric bushing 104. The bushing 104 is received in a snug fit in the hole 18, but is permitted to rotate about the bushing exterior surface axis 114 relative to the link. A semicylindric notch 122 is provided in the interior surface of the link hole 118. The link notch 122 has substantially the same dimensions as the busing notches 116.

A lock pin 124 is provided for insertion in the link notch 122 and an aligned one of the bushing notches 116. By inserting the pin 124 in the aligned link notch 122 and bushing notch 116, the eccentric bushing 104 is locked in a set, stationary position relative to the enlarged link end 102. By removing the pin 124 and rotating the eccentric bushing 104 in the link hole 118, the bushing hole axis 108 can be adjustably positioned along the length of the link and along the length of the strut 22. By adjusting the position of the bushing center hole axis 108 along the strut 122, the overall length of the strut 22 is adjusted. When the eccentric bushing 104 is rotated to its desired position relative to the link hole 118 for the desired length of the strut 22, the pin 124 is inserted through the aligned link notch 122 and bushing notch 116 to lock the bushing 104 in its adjusted position relative to the strut 22.

APPARATUS STRUT VARIANT

Figure 9:
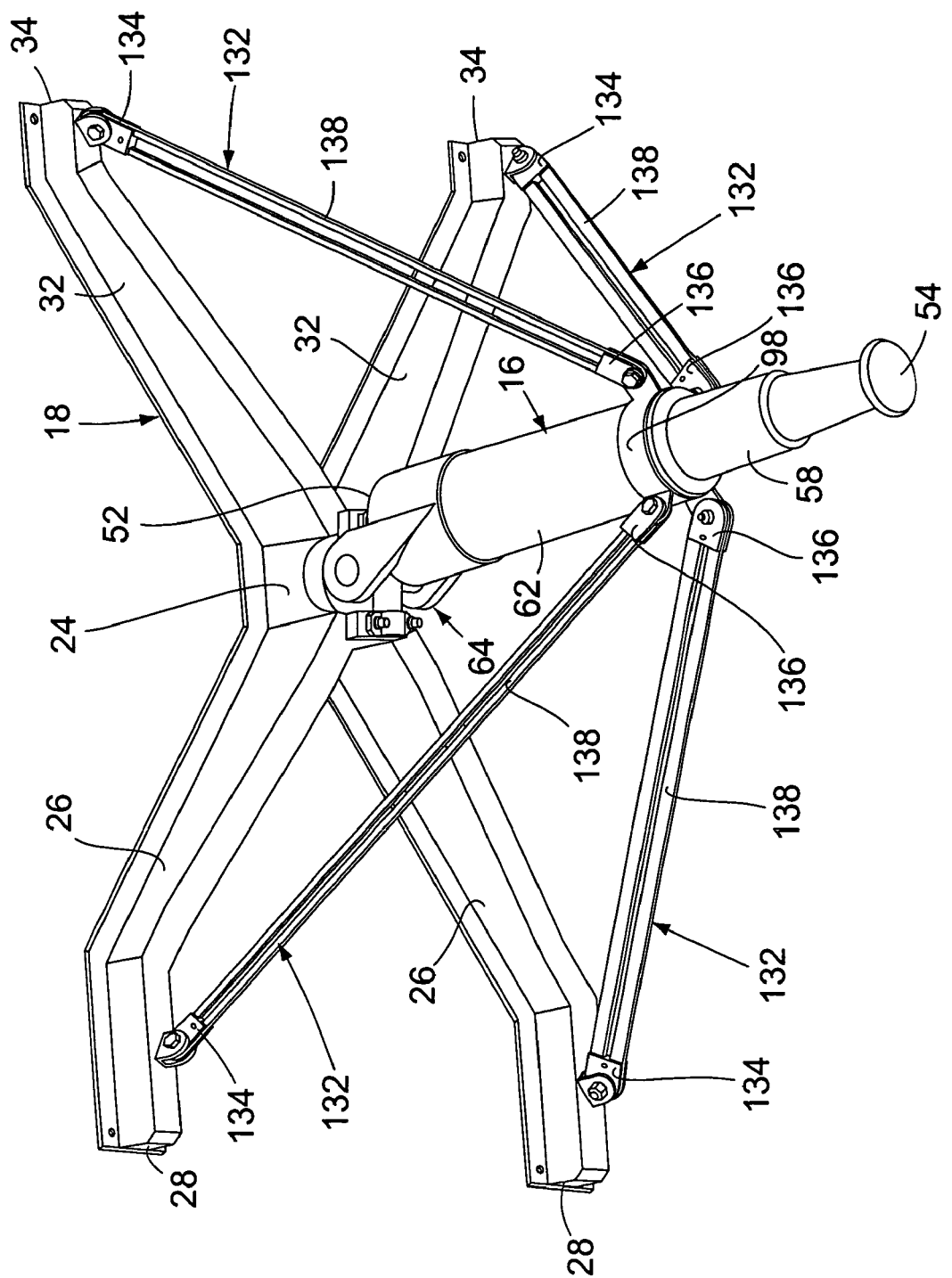
FIG. 9 is a bottom perspective view of the apparatus employing a second embodiment of stabilizing struts.

FIGS. 9-12 show a variant embodiment of the struts 132 of the aircraft landing assist apparatus 12. The remaining component parts of the apparatus 12 shown in FIG. 9 are the same, only the struts 132 are different in construction from the earlier described struts 22.

Each of the struts 132 has a length with a proximal end connector 134 at one end and a distal end connector 136 at an opposite end of the strut. The strut 132 includes a flexible band that extends between the proximal end connector 134 and the distal end connector 136. In this embodiment of the struts 132, the band 138 is formed by one or more loops of a composite material, for example, graphite and epoxy. An elongate graphite strand is looped around the proximal end connector 134 at one end of the strut, and around the distal end connector 136 at the opposite end of the strut. The epoxy is applied to the looped graphite and cured to form the final configuration of the flexible strut.

Figure 10:
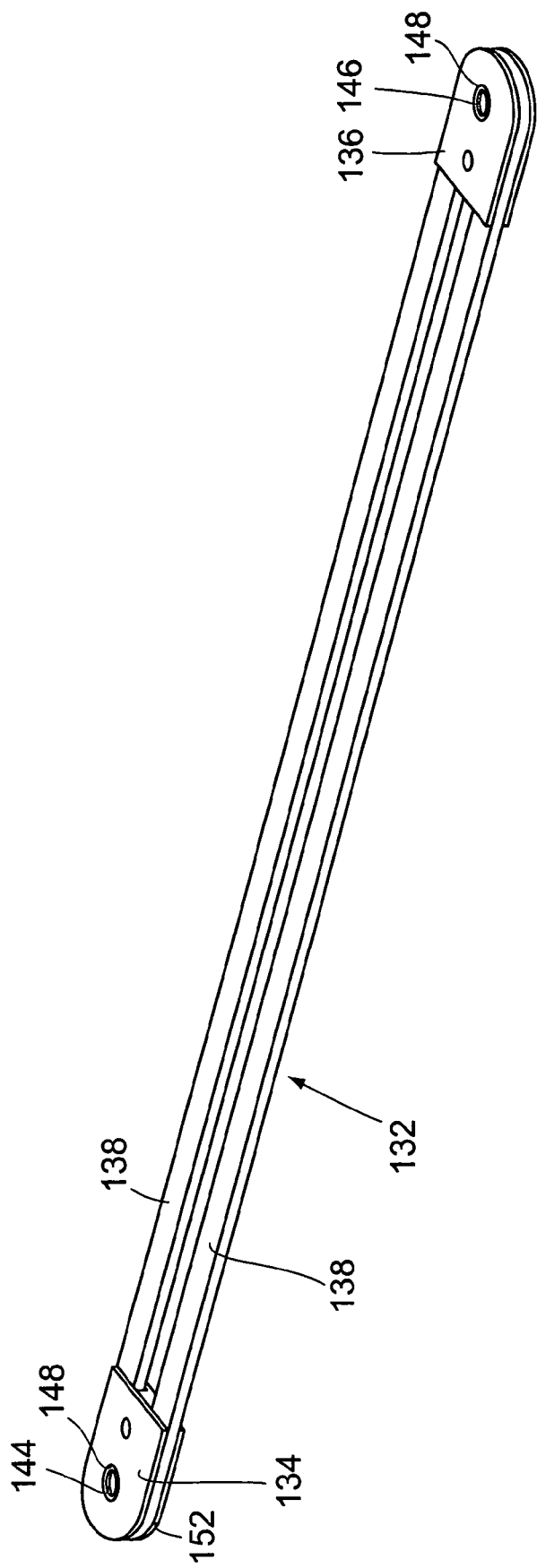
FIG. 10 is a view of a stabilizing strut removed from the apparatus of FIG. 9.

As shown in FIGS. 10-12, both the proximal end connector 134 and the distal end connector 136 have pivot holes 142, 144. The pivot holes 142, 144 are adapted for a pivot connection to an arm of the base 18 and the probe slip ring 98, respectively.

FIGS. 11 and 12 show the details of the construction of one of the end connections 134. Each connector is provided with a pivot bushing 148 inserted into the connector pivot hole 144. The connector has a general Ushaped exterior surface 152 that extends around the connector. A slot 154 is recessed into the U-shaped surface 152 of the connector. A loop formed in the band 138 is received in the slot 154. Mutually opposed surfaces 156 of the slot 154 resist the removal of the looped portion of the band 138 from the slot. The engagement of the opposed surfaces 156 with the looped portion of the band 138 resists this portion of the band exiting the slot 154 when the strut 132 is compressed due to movement of the probe 16. A projection 158 is formed in one of the slot surfaces 156 and a recess 162 is formed in the opposite slot surface 156. The projection 158 presses a portion of the looped band 138 into the recess 162 and further resists removal of the portion of the band 138 from the slot 154 when the strut 132 is compressed.

On minor compression loads on the strut 132, the bands 138 will bend, but will not pop off the connectors 134, 136. On larger compressive loads on the strut 132, the looped ends of the bands will squeeze past the projections 158. This operation further controls the rate at which the strut collapses.

APPARATUS SLIP RING LOCK MECHANISM

Figure 13:
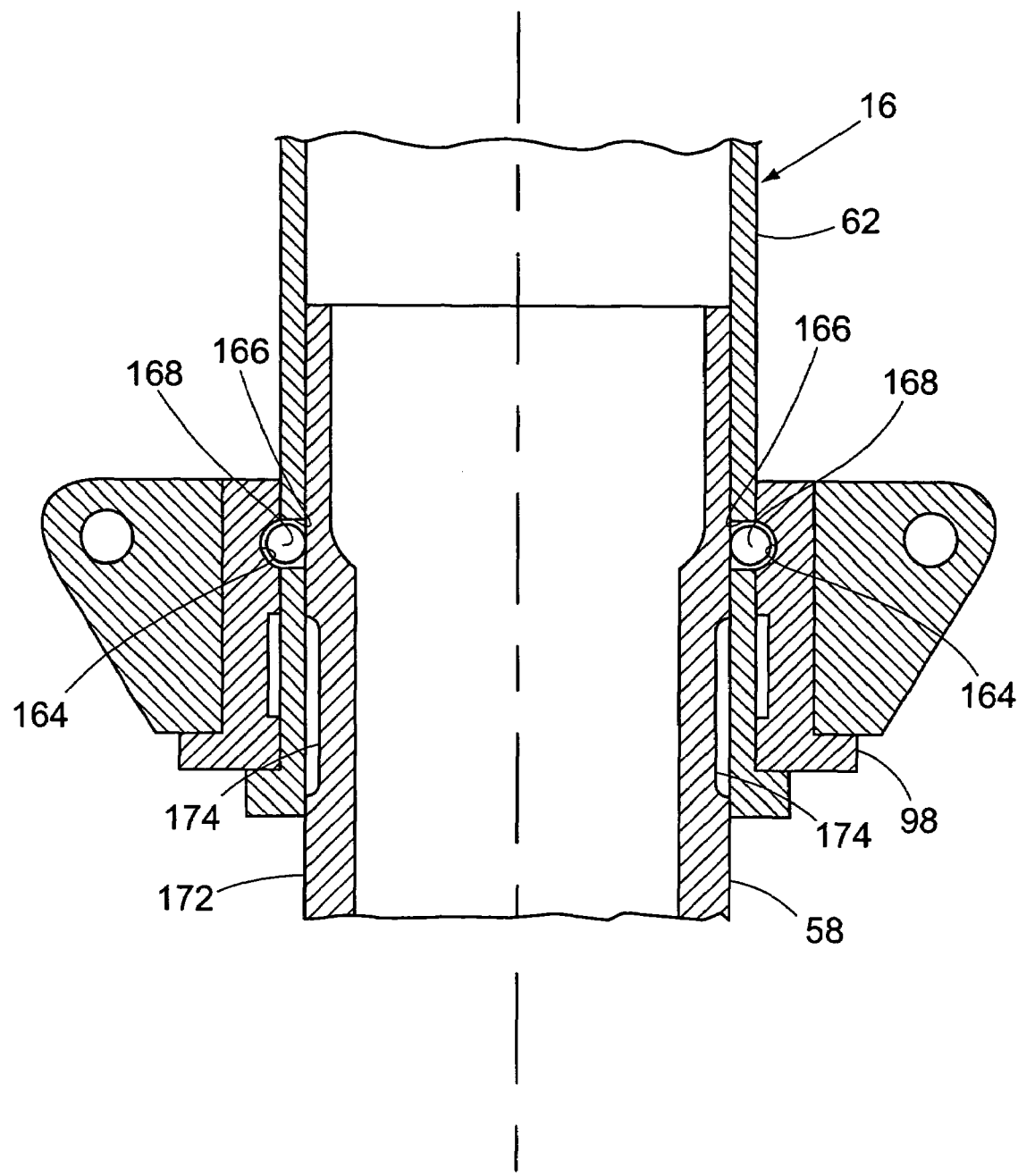
FIG. 13 is a partial, sectioned view of the landing probe and lock mechanism of the apparatus.

FIG. 13 shows a lock mechanism that secures the slip ring 98 in position on the landing assist probe 16. The slip ring 98 is shown mounted on a lower end of the probe proximal end portion 62. The upper end of the probe distal end portion 58 is shown telescopically received in an interior bore of the probe proximal end portion 62. As explained earlier, the conventional construction of a landing assist probe includes a spring mechanism or shock absorber in the interior of the probe that biases the probe distal end portion 58 downwardly relative to the probe proximal end portion 62. The spring mechanism or shock absorber are not shown in FIG. 14.

Figure 14:
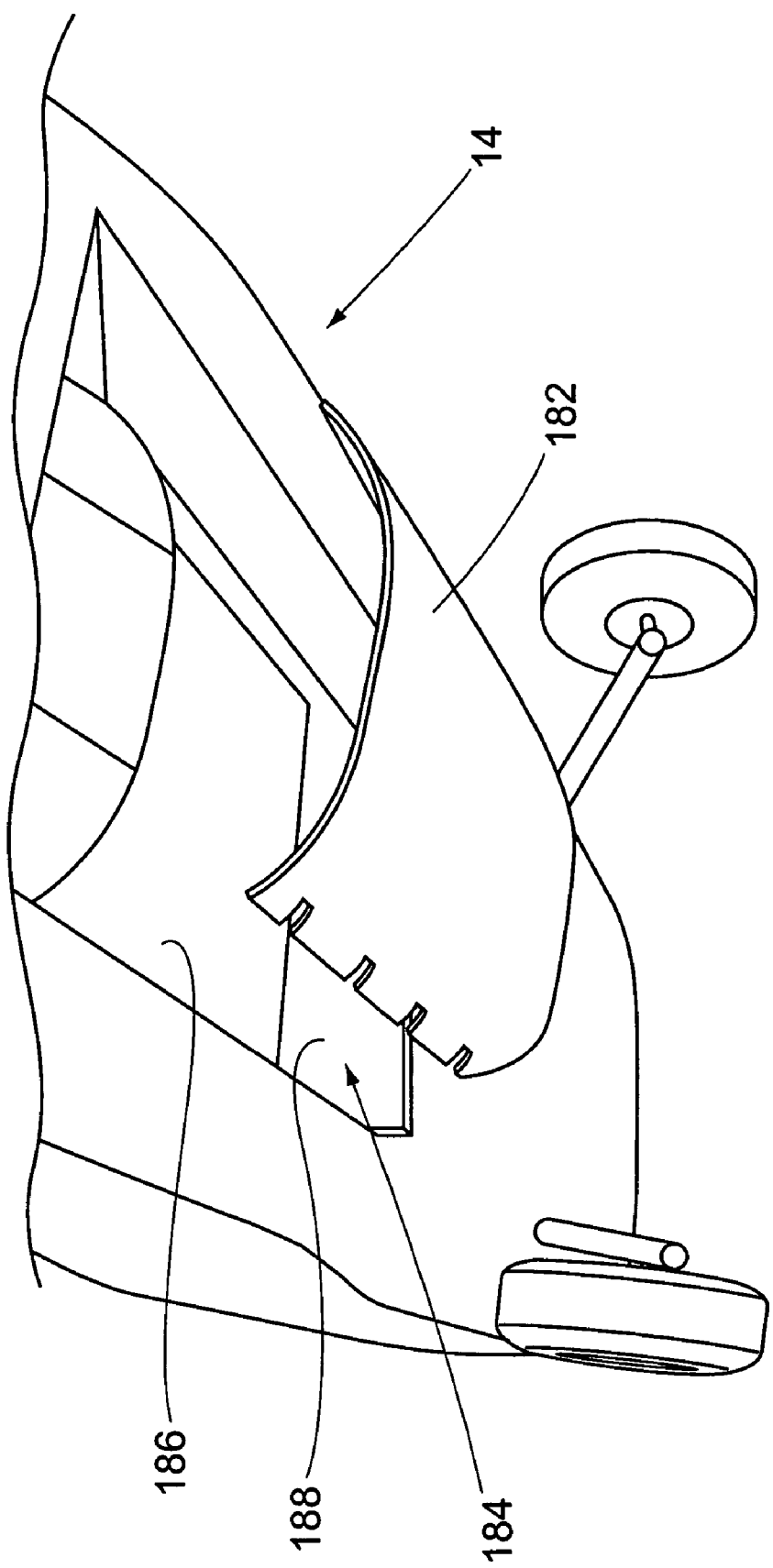
FIG. 14 is a view of the underside of the aircraft, with the bottom fuselage panel being removed.

The lock mechanism of the slip ring 98 includes a plurality of semispherical recesses 164 that are formed into the interior surface of the slip ring 98. The semispherical recesses 164 are spatially arranged around the interior surface of the slip ring 98. An equal number and size of circular holes 166 is provided through the proximal end portion 62 of the probe. The holes 166 are equal in number to the recesses 164 and are positioned opposite the recesses as shown in FIG. 14. A plurality of balls 168, for example ball bearings, are received in the probe holes 166. The balls 168 engage against the exterior surface 172 of the probe distal end portion 158 and extend through the probe proximal end holes 166 and into the slip ring recesses 164. Thus, in the positions of the balls 168 shown in FIG. 14, the balls prevent the slip ring 98 from moving relative to the probe proximal end portion 62. Just below the proximal end portion holes 166, a plurality of elongate grooves 174 are formed in the exterior surface 172 of the probe distal end portion. The grooves 174 are equal in number to the proximal end portion holes 166 and are dimensioned to receive the balls 168 in the grooves.

As stated earlier, with the balls 168 positioned in the probe proximal end holes 166 and in the slip ring recesses 164 as shown in FIG. 14, the balls 168 hold the slip ring 98 stationary on the probe 16. When a compressive force is exerted on the probe distal end due to contact of the probe with a deck of a ship, the probe distal end portion 58 begins to move upwardly relative to the probe proximal end portion 62. When the probe distal end portion 58 moves to the extend that the grooves 174 align with the probe proximal end portion holes 166, the lock mechanism balls 168 can move into the grooves 174 and out of the slip ring recesses 164. This frees the slip ring 98 for movement over the exterior surface of the probe 16. Thus, on excessive impact of the probe 16 with the deck of a ship causing significant movement between the probe distal end portion 58 and the probe proximal end portion 62, the lock mechanism of the probe is released and the slip ring 98 is free to move over the exterior surface of the probe 16 controlling the collapse of the probe under the aircraft.

APPARATUS ASSEMBLY

FIGS. 14-22 illustrate the steps involved in assembling the aircraft landing assist apparatus 12 to an aircraft. In the illustrative environment of FIGS. 14-22, the apparatus 12 is retrofit to an AH64 Apache helicopter. Again, it should be understood that this is only one example of an aircraft with which the apparatus may be employed. However, the steps involved in retrofitting the apparatus 12 to the aircraft are contemplated as being basically the same for other types of aircraft employing the apparatus.

In retrofitting the apparatus 12 to an aircraft such as a helicopter, it is first necessary to modify the helicopter internal construction to accommodate the apparatus and the forces involved in using the apparatus. FIG. 14 shows the removal of a bottom fuselage panel 182 from the aircraft 14, exposing an interior bay 184 of the aircraft. In the illustrative environment shown, exposing the aircraft interior bay 184 also exposes an ammunition container 186 contained in the bay.

Figure 15:
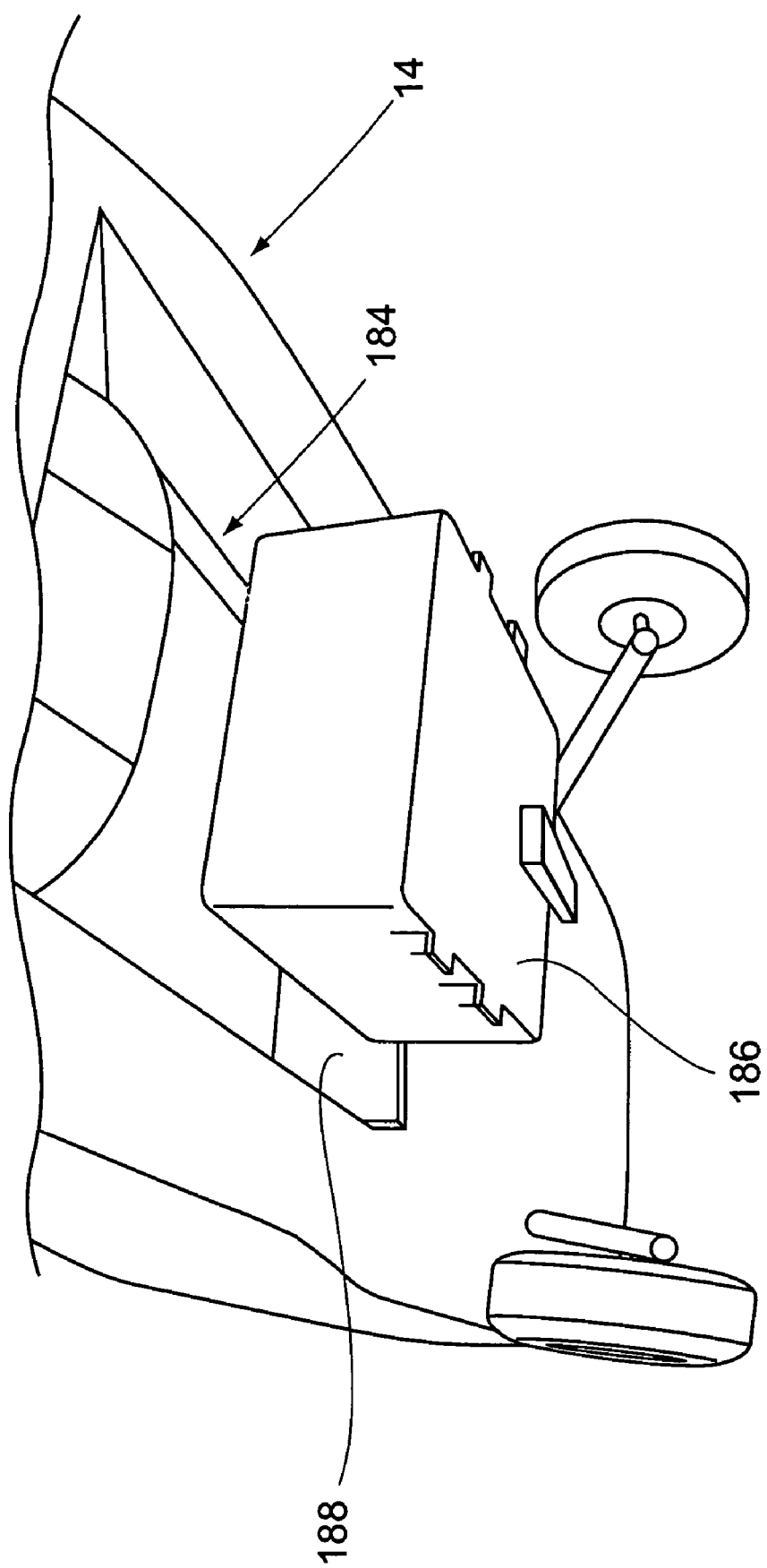
FIG. 15 is a view of the underside of the aircraft, with the ammunition container being removed.

FIG. 15 shows the next step in the retrofitting of the apparatus to the aircraft 14. In FIG. 15 the ammunition container 186 is removed from the aircraft interior bay 184, exposing a forward bulkhead wall 188 and a rearward bulkhead wall 192 in the aircraft.

Figure 16:
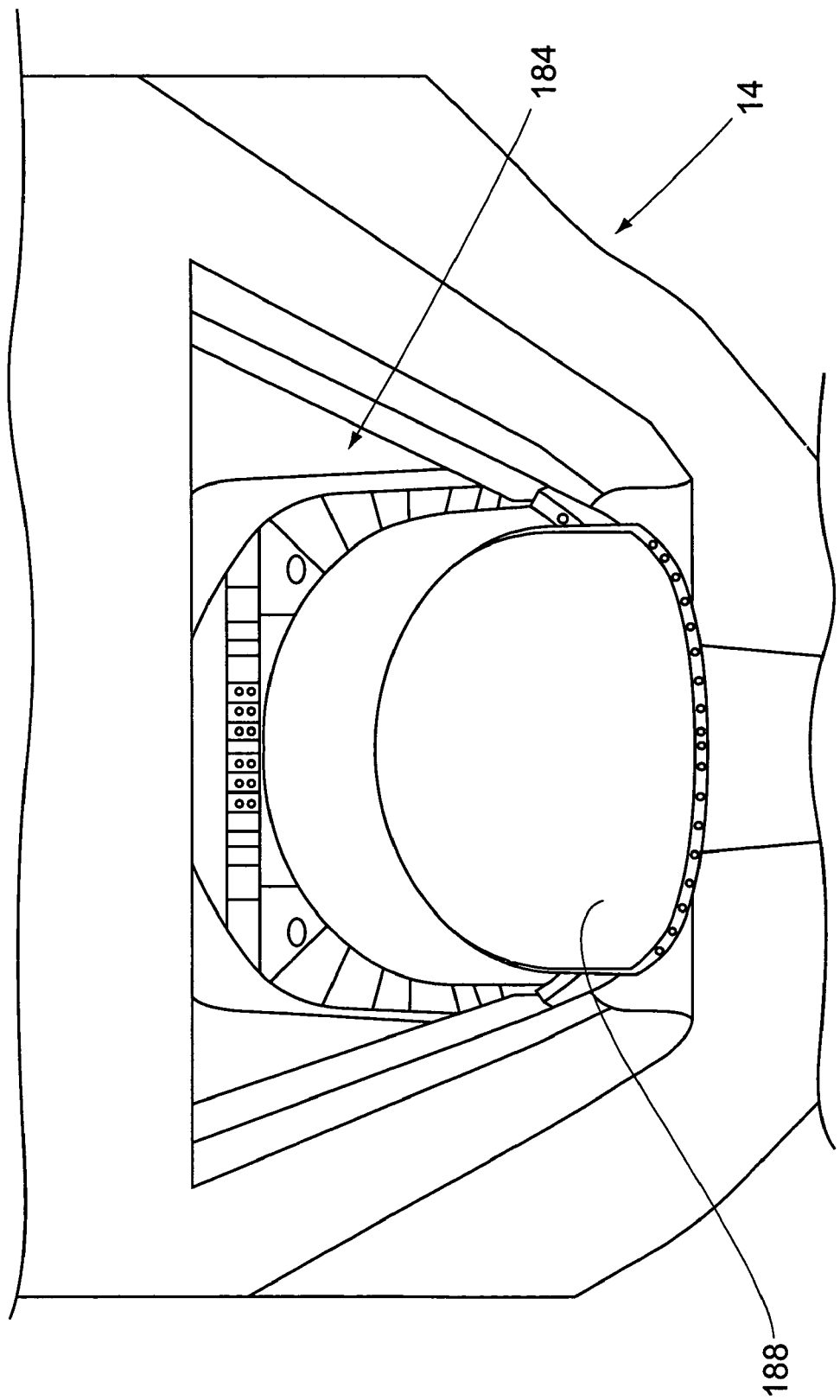
FIG. 16 is a view into the aircraft bay, showing removal of an existing forward bulkhead.
Figure 17:
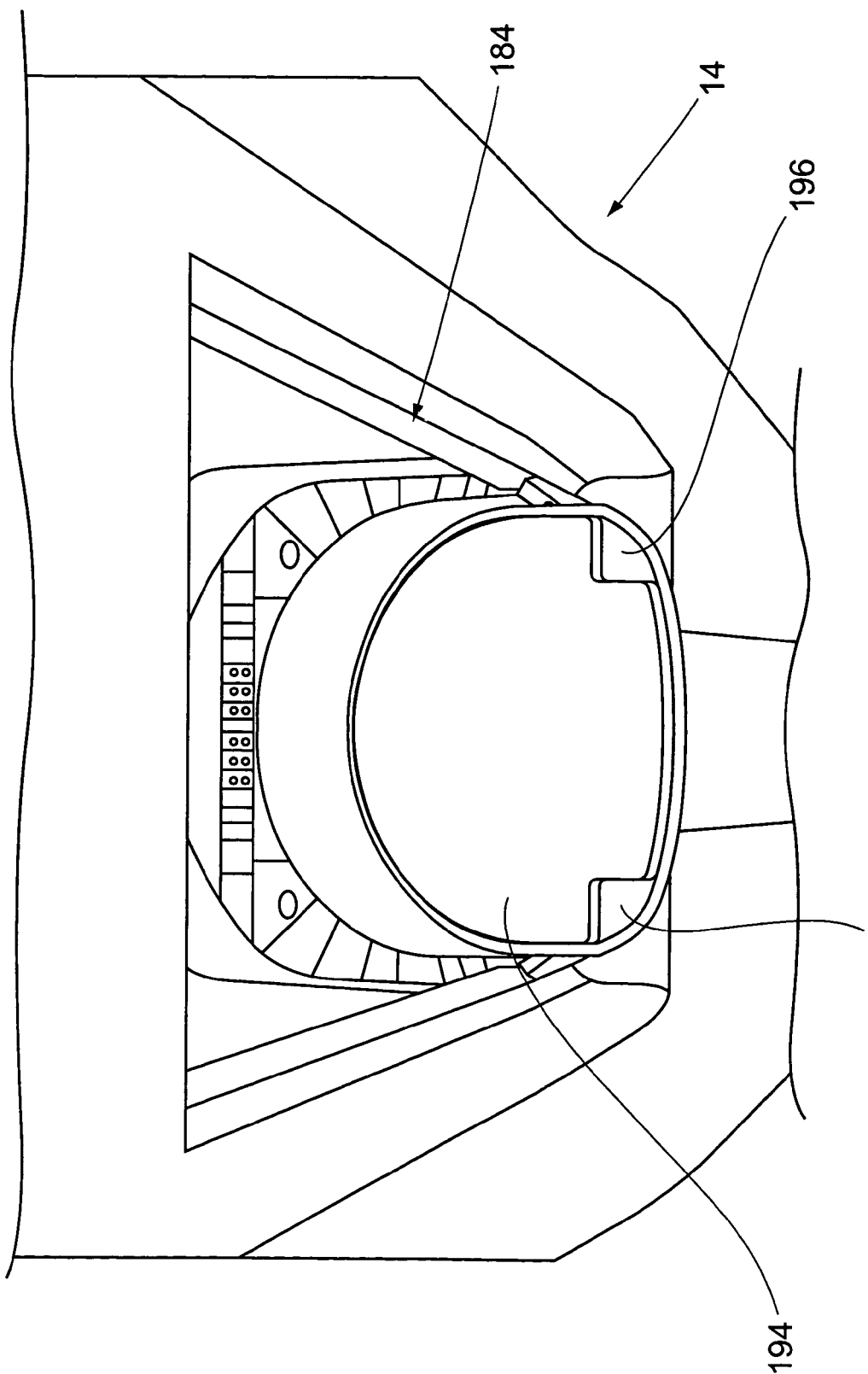
FIG. 17 is a view into the forward end of the aircraft bay showing insertion of a modified, reinforced forward bulkhead.
Figure 18:
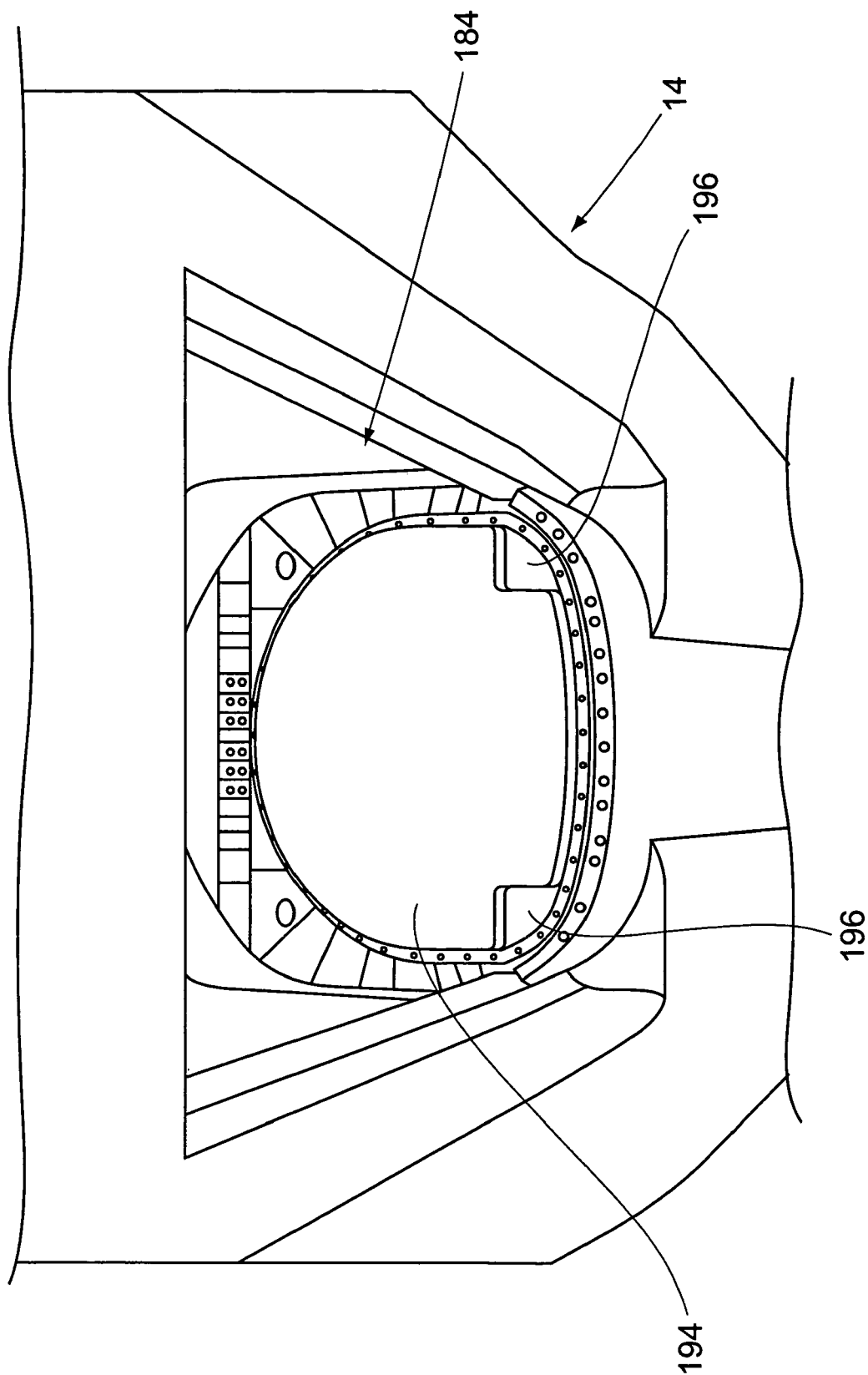
FIG. 18 is a view into the forward end of the aircraft bay showing the reinforced forward bulkhead installed.

The existing forward bulkhead wall 188 and rearward bulkhead wall 192 were designed to provide structural strength to the aircraft to support the aircraft from its main rotor blades when the aircraft is being operated. The bulkhead walls were not designed to receive the impact forces involved with the use of the landing assist apparatus 12 attached to the underside of the aircraft 14. Therefore, the interior construction of the aircraft requires modification. FIG. 16 shows the next step involved in modifying the aircraft interior construction where the existing forward bulkhead wall 188 is removed from the aircraft interior bay 184. FIG. 17 shows a replacement, reinforced forward bulkhead wall 194 being installed in the aircraft interior bay 184 in place of the removed forward bulkhead wall 188. The reinforced forward bulkhead wall 194 is provided with reinforced mounting areas 196 that are designed to receive the impact forces transmitted to the underside of the aircraft from the apparatus 12 contacting with a ship deck. FIG. 18 shows the reinforced forward bulkhead wall 194 completely installed in the aircraft interior bay 184 in place of the removed forward bulkhead wall 188.

Figure 19:
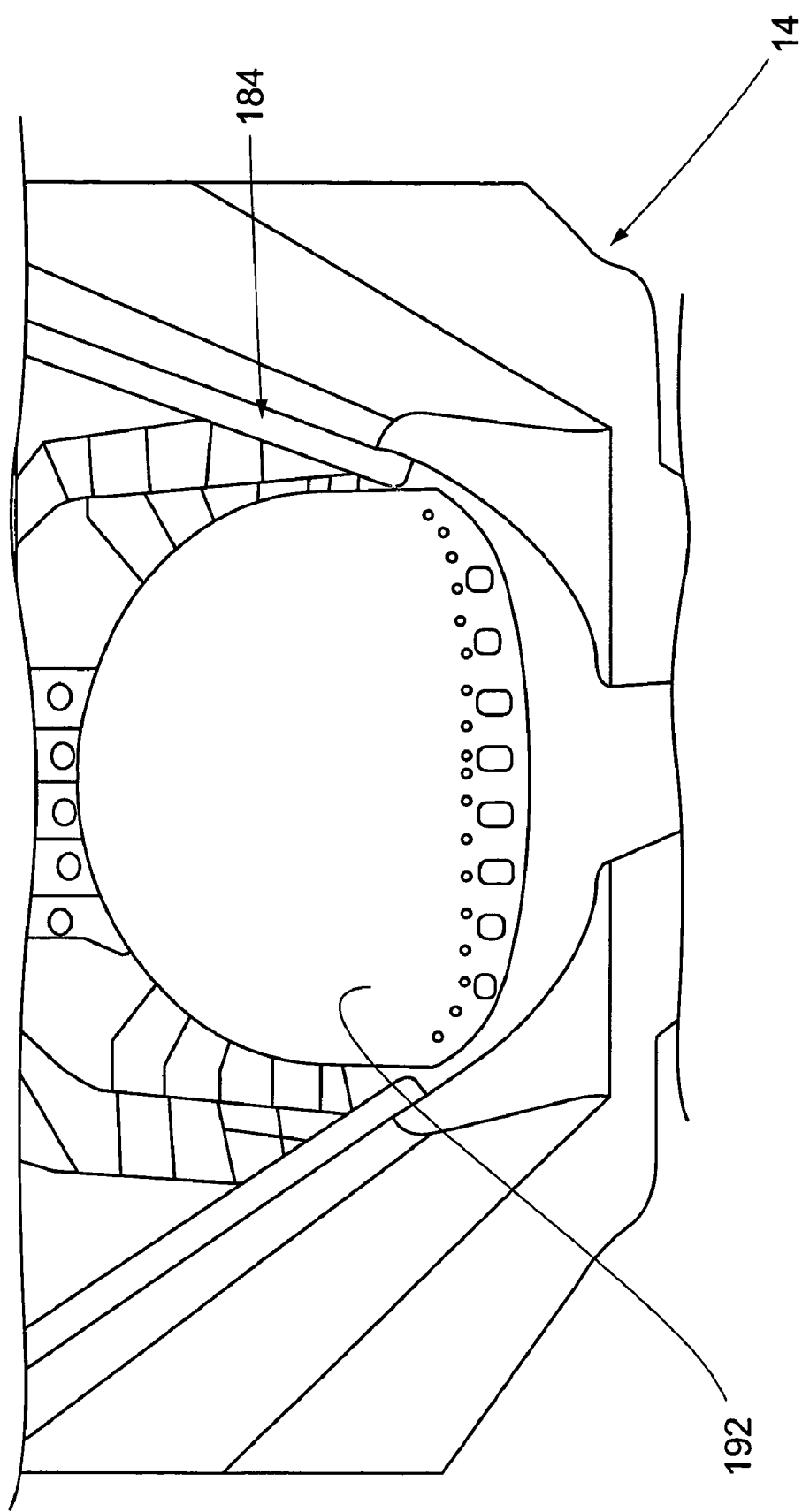
FIG. 19 is a view into the rearward end of the aircraft bay showing the existing rearward bulkhead.
Figure 20:
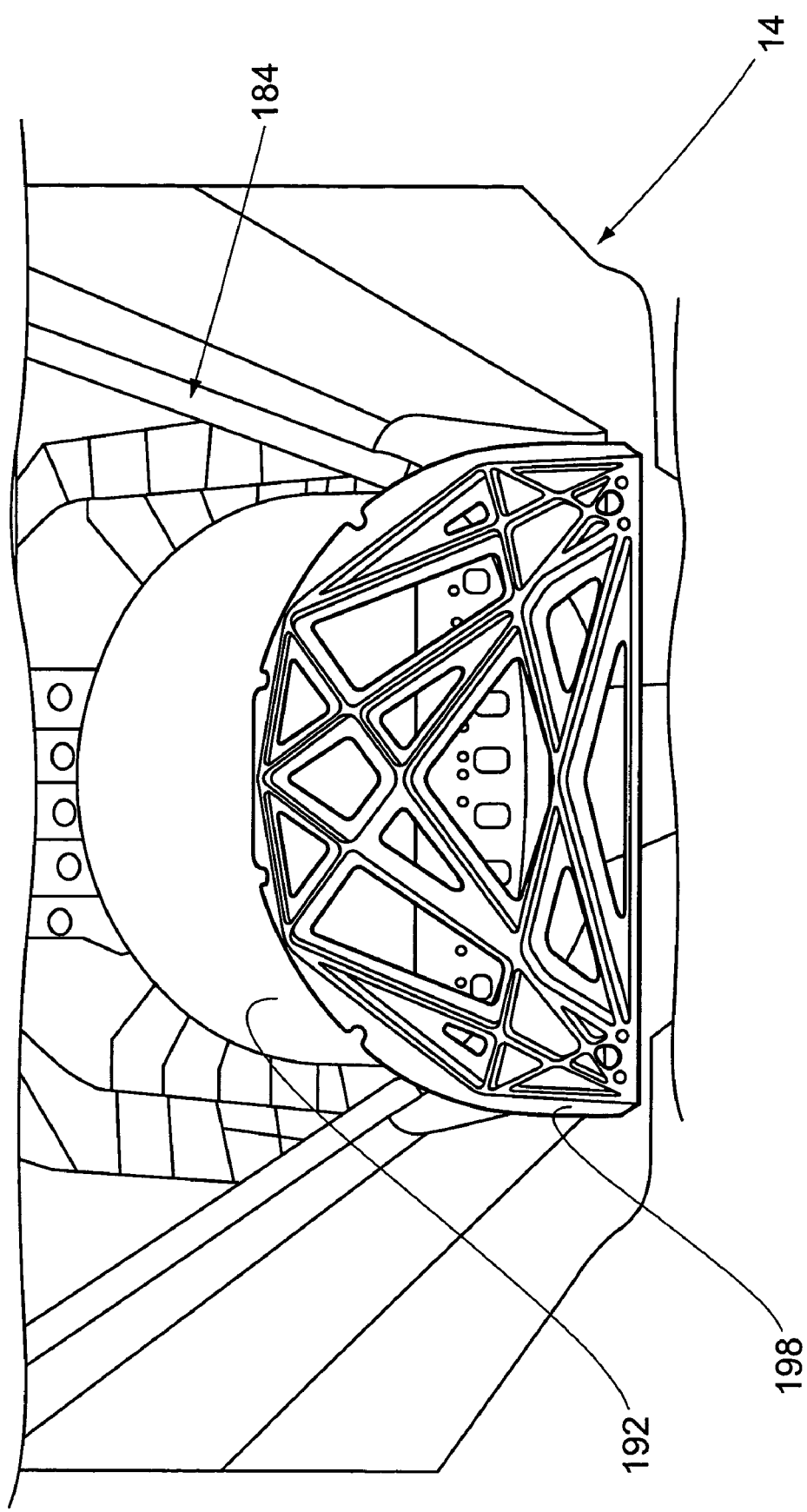
FIG. 20 is a view into the rearward end of the bay showing the installation of a reinforcement of the rearward bulkhead.
Figure 21:
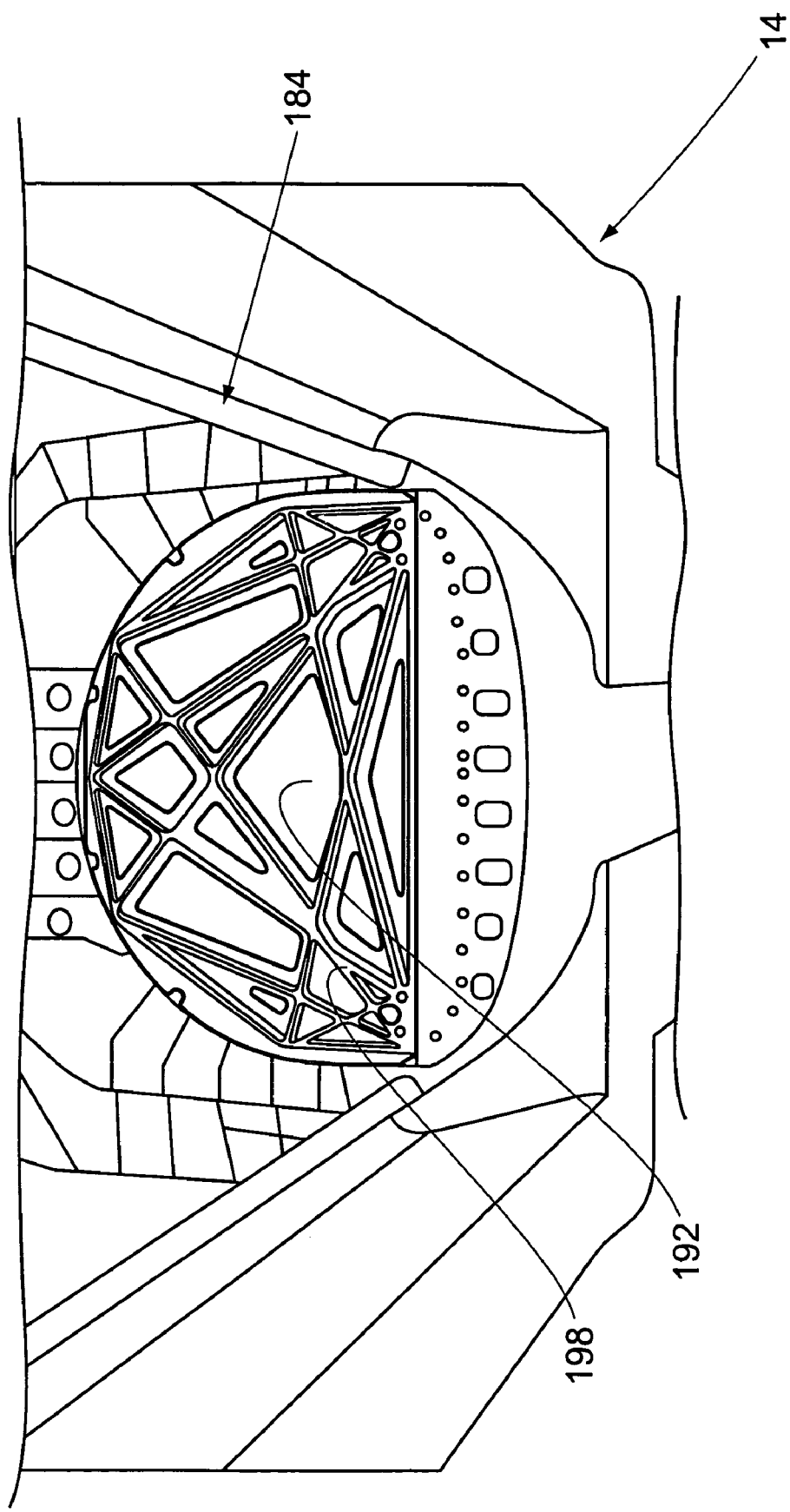
FIG. 21 is a view into the rearward end of the bay showing the reinforced bulkhead installed.

FIG. 19 shows the existing rearward bulkhead wall 192 at the rearward end of the aircraft interior bay 184. The rearward bulkhead wall 192 is not removed from the aircraft interior structure in preparing the aircraft for the apparatus 12. Instead, a reinforced rearward bulkhead 198 shown in FIG. 20 is inserted into the aircraft interior bay 184 and is secured to the rearward bulkhead wall 192. FIG. 21 shows the reinforced rearward bulkhead wall 198 in the interior construction of the aircraft secured to the rearward bulkhead wall 192. The reinforced rearward bulkhead wall 198 is designed to receive the impact forces transmitted to the underside of the aircraft by the apparatus 12 impacting with a ship deck.

Figure 22:
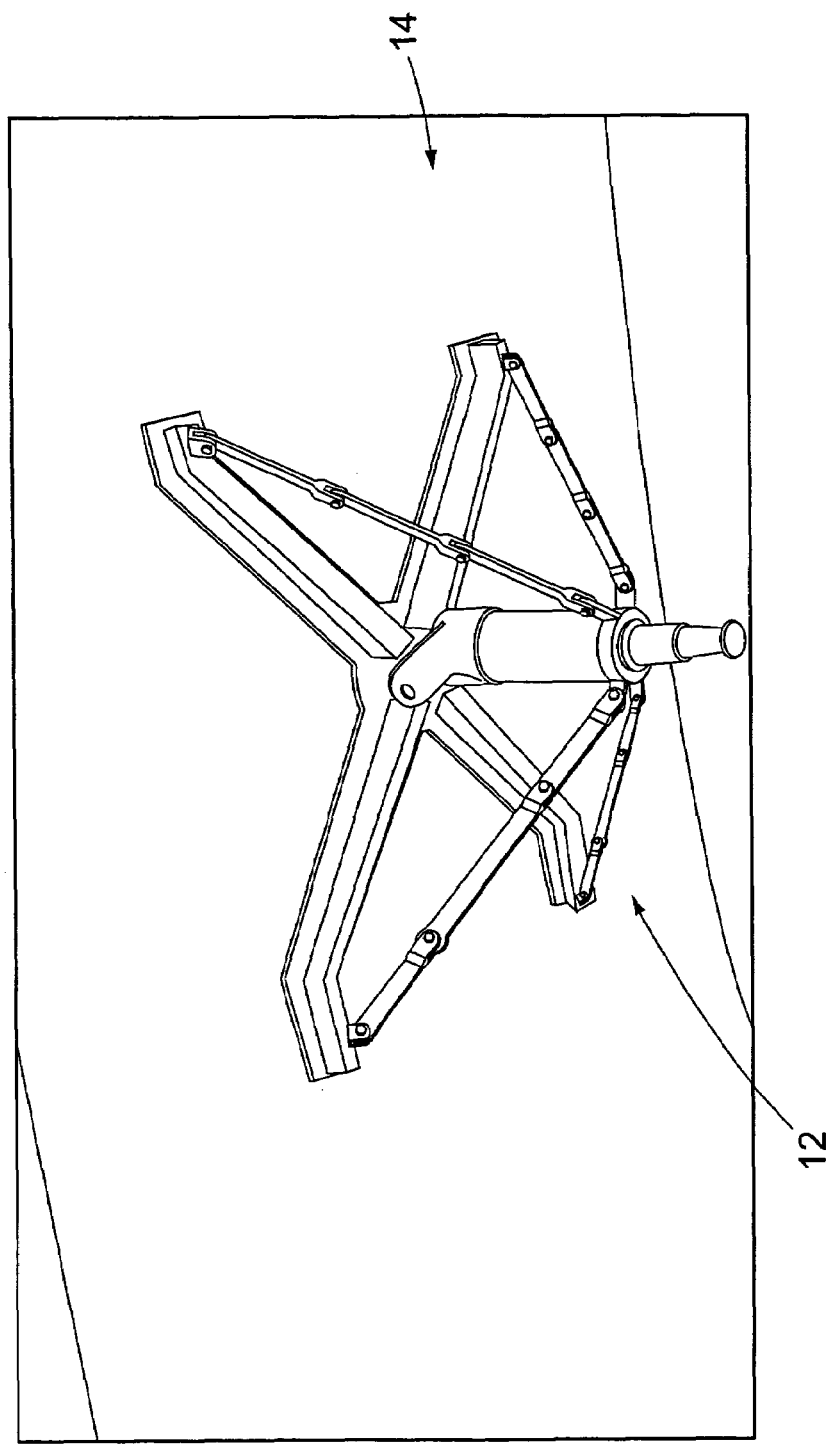
FIG. 22 is a view of the underside of the aircraft showing the apparatus installed.

With the reinforced forward bulkhead 194 and reinforced rearward bulkhead 198 installed in the aircraft interior construction at the opposite ends of the interior bay 184, the previously removed ammunition container 186 is reinstalled in the aircraft and the bottom fuselage panel 182 is replaced on the aircraft. The apparatus 12 of the disclosure is then installed on an underside of the aircraft with the apparatus base forward arms 26 transmitting impact forces to the reinforced forward bulkhead wall 194 and the apparatus base rearward arms 32 transmitting impact forces to the reinforced rearward bulkhead wall 198. FIG. 22 shows the apparatus 12 in its retrofit position on the underside of the aircraft 14.

APPARATUS OPERATION

Figure 23:
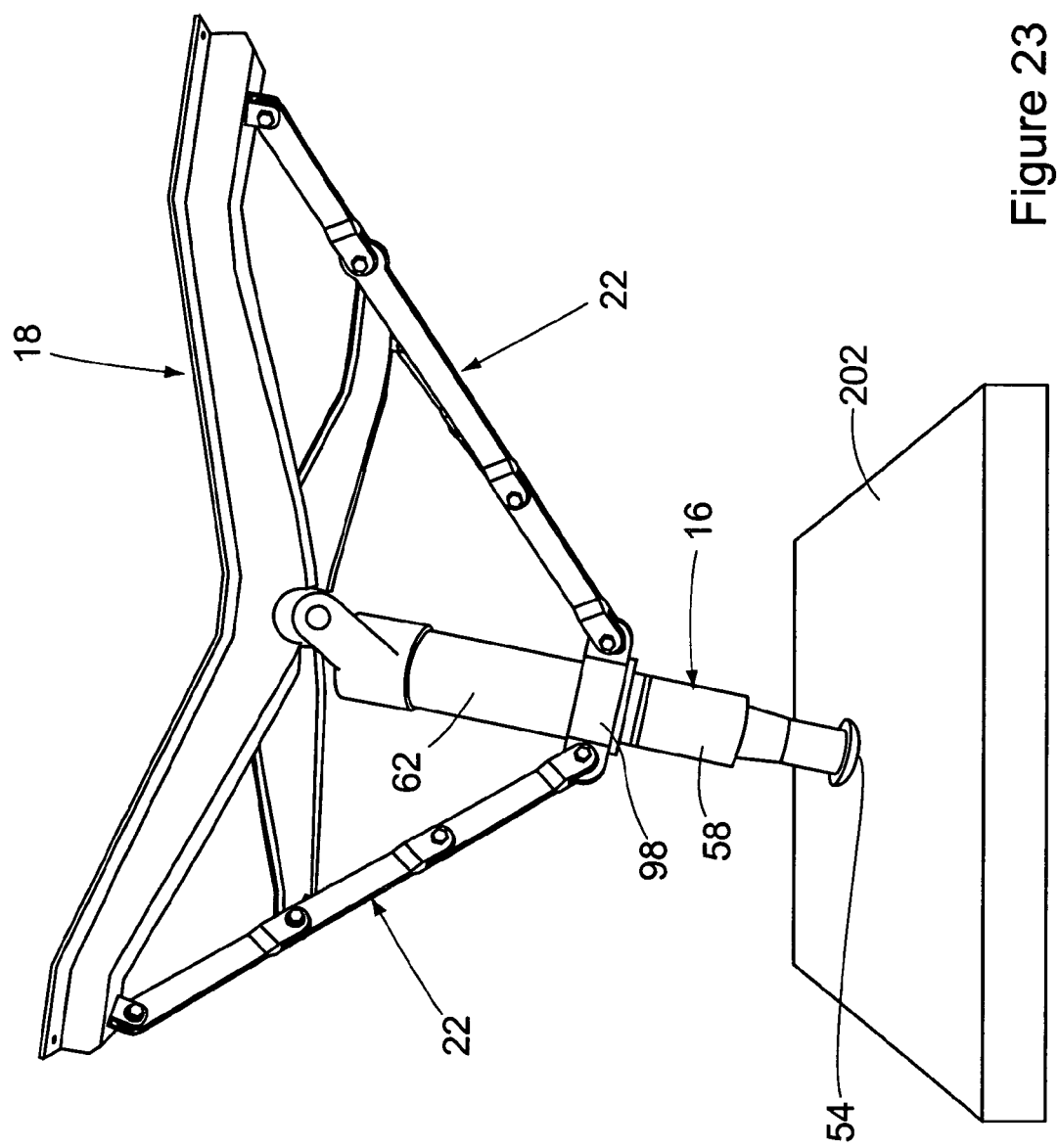
FIG. 23 is a side view of an initial stage of operation of the landing assist apparatus.
Figure 24:
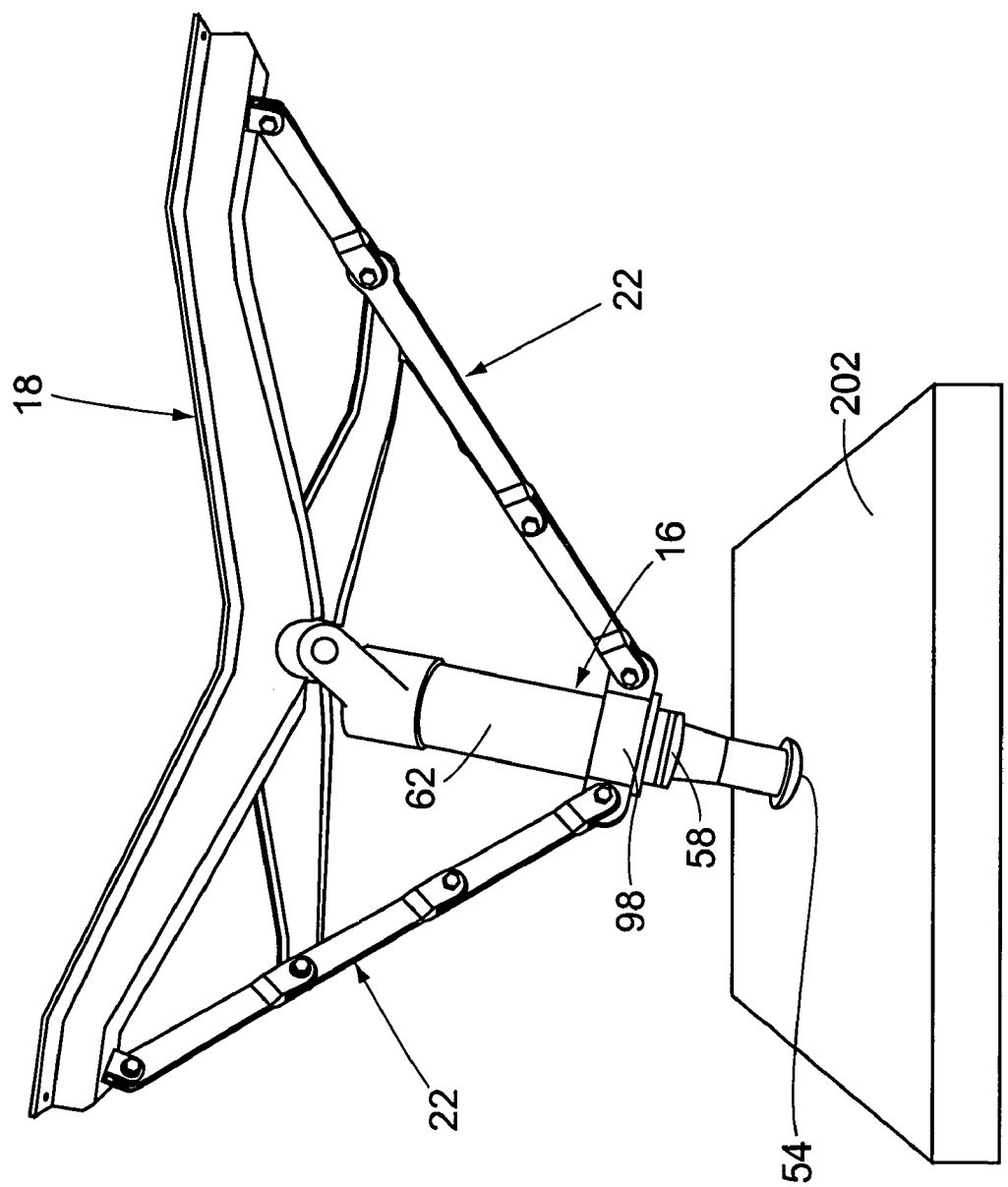
FIG. 24 is a side view of the operation of the apparatus, subsequent to that of FIG. 23.
Figure 25:
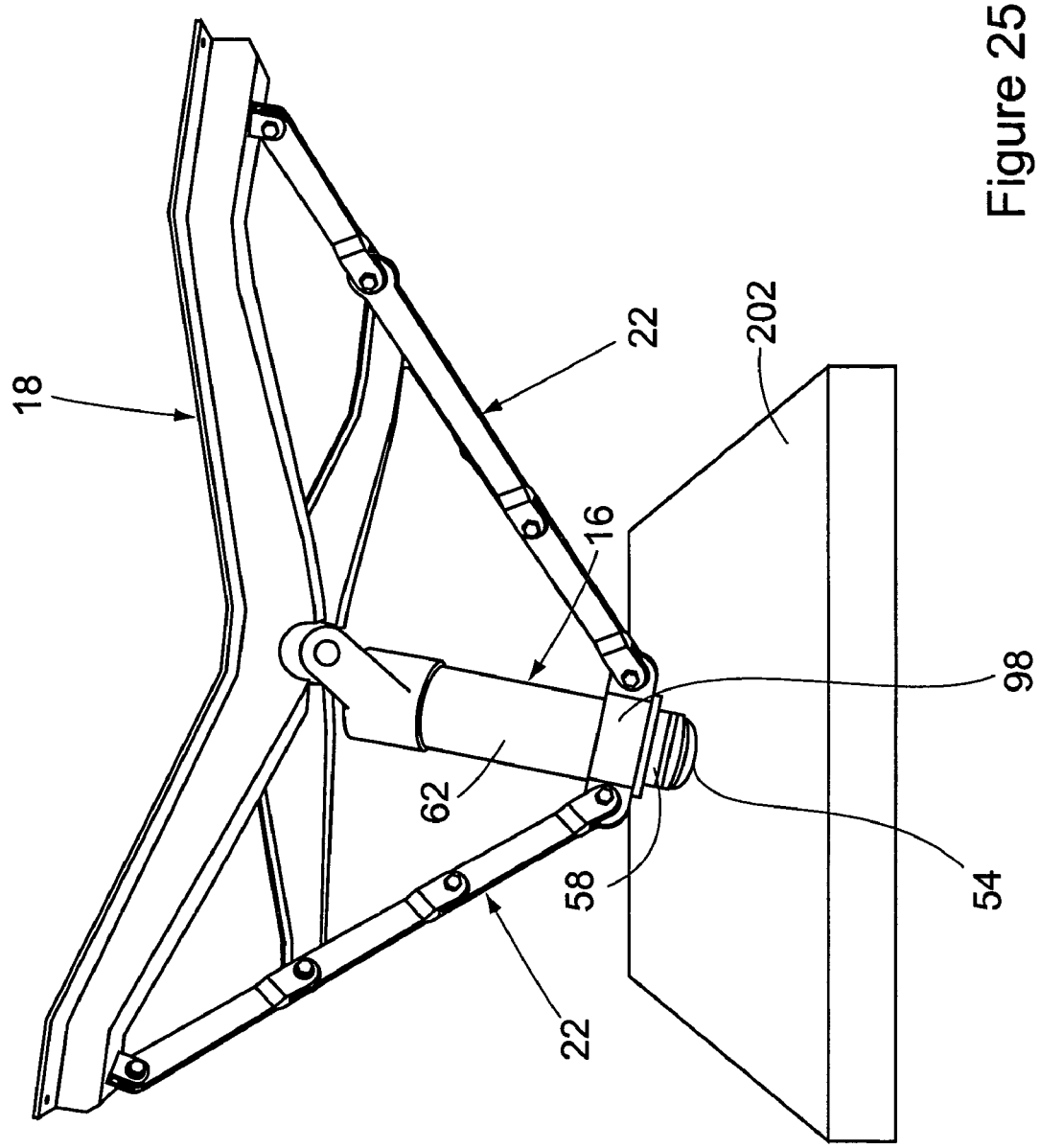
FIG. 25 is a side view of the operation of the apparatus, subsequent to that of FIG. 24.
Figure 26:
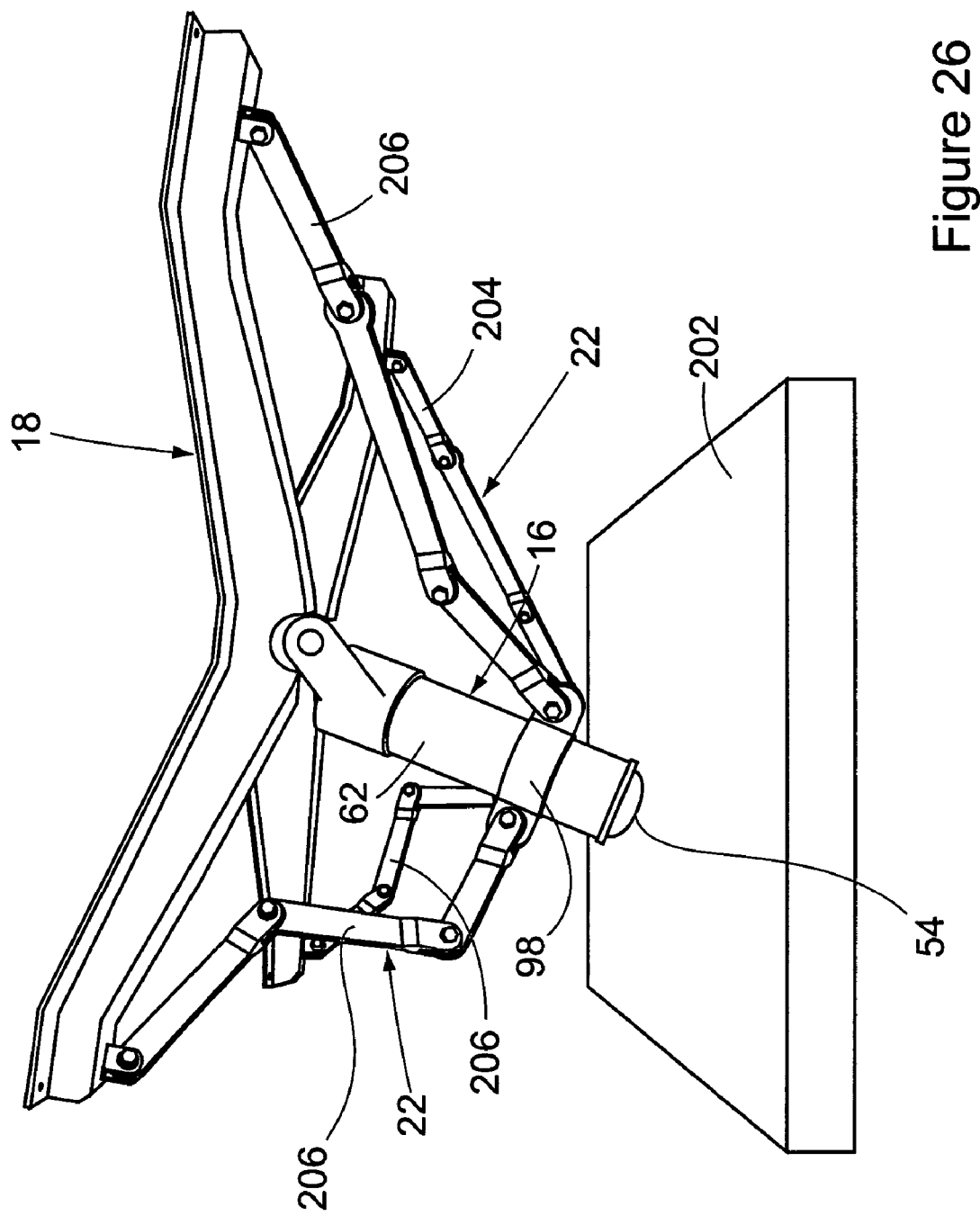
FIG. 26 is a side view of the operation of the apparatus, subsequent to that of FIG. 25.
Figure 27:
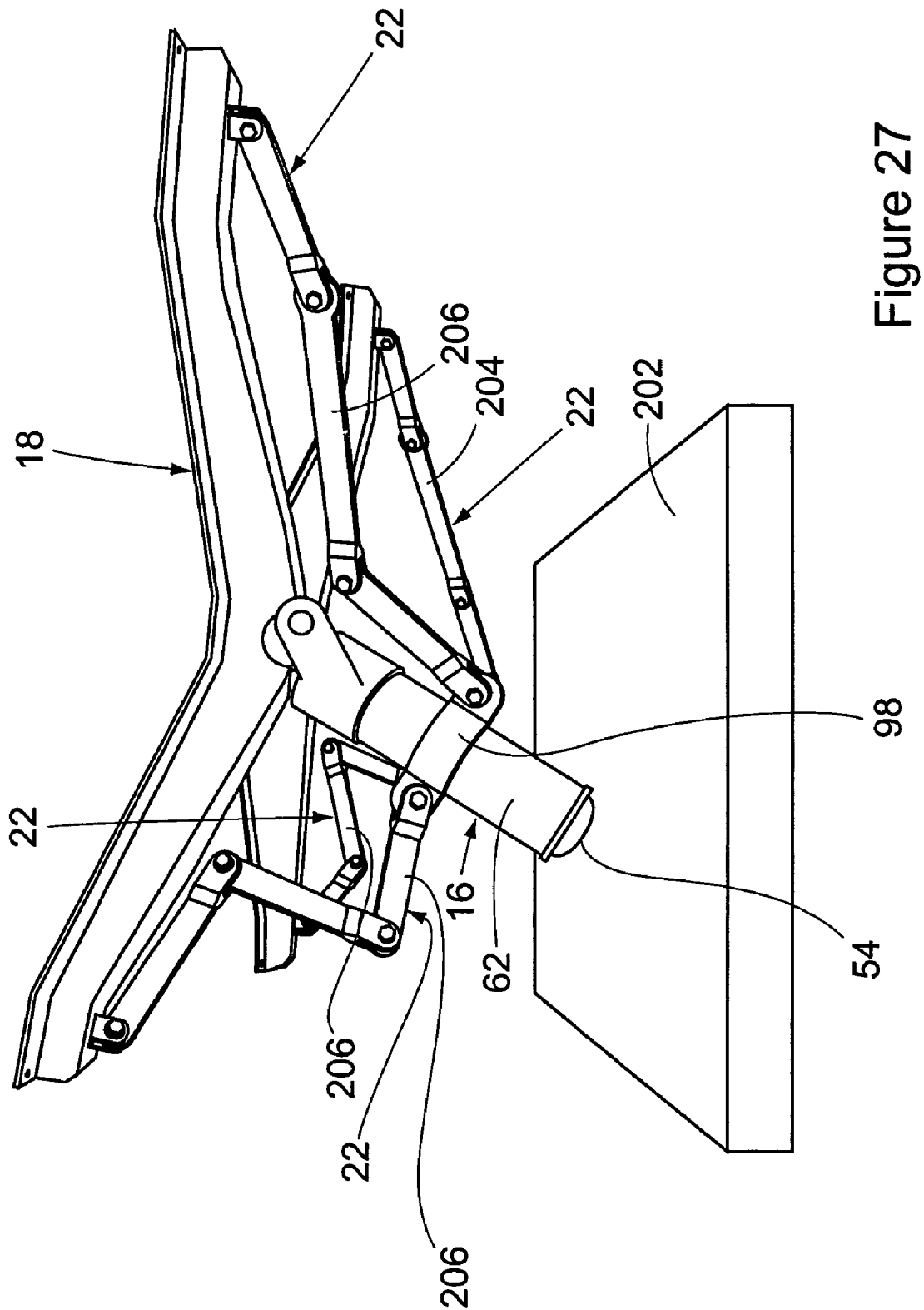
FIG. 27 is a side view of the operation of the apparatus, subsequent to that of FIG. 26.

FIGS. 23-27 shows the sequence of operation of the aircraft landing assist apparatus 12 of the present disclosure. In FIG. 23 the probe distal end 54 just comes into contact with the surface of a ship deck 202 during the landing operation of an aircraft to which the apparatus 12 is attached. FIG. 24 shows the distal end portion 58 of the probe 16 being pushed into the proximal end portion 62 of the probe due to the force of impact of the apparatus 12 with the ship deck 202 during the landing operation. FIG. 25 shows the probe distal end portion 58 pushed to its maximum retracted position relative to the probe proximal end portion 62. In this position of the probe distal end portion 58 relative to the probe proximal end portion 62, the lock mechanism of the probe is disengaged and the slip ring 98 is free to move along the length of the probe 16. FIG. 26 shows the slip ring 98 moved upwardly over the probe proximal end portion 62 with one of the struts 204 being pulled in tension due to the impact on the probe 16, and the remaining struts 206 collapsing under compression forces. The one strut 204 pulled in tension also causes the slip ring 98 to move upwardly across the exterior surface of the probe proximal end portion 62. In FIG. 27 the probe connector assembly 64 has pivoted relative to the base 18 to the extent that the first shaft 74 of the cross shaft assembly has collapsed, controlling the collapse of the probe 16 relative to the base 18 where the probe proximal end 52 is prevented from piercing through the bottom fuselage panel 182 of the aircraft.

Figure 28:
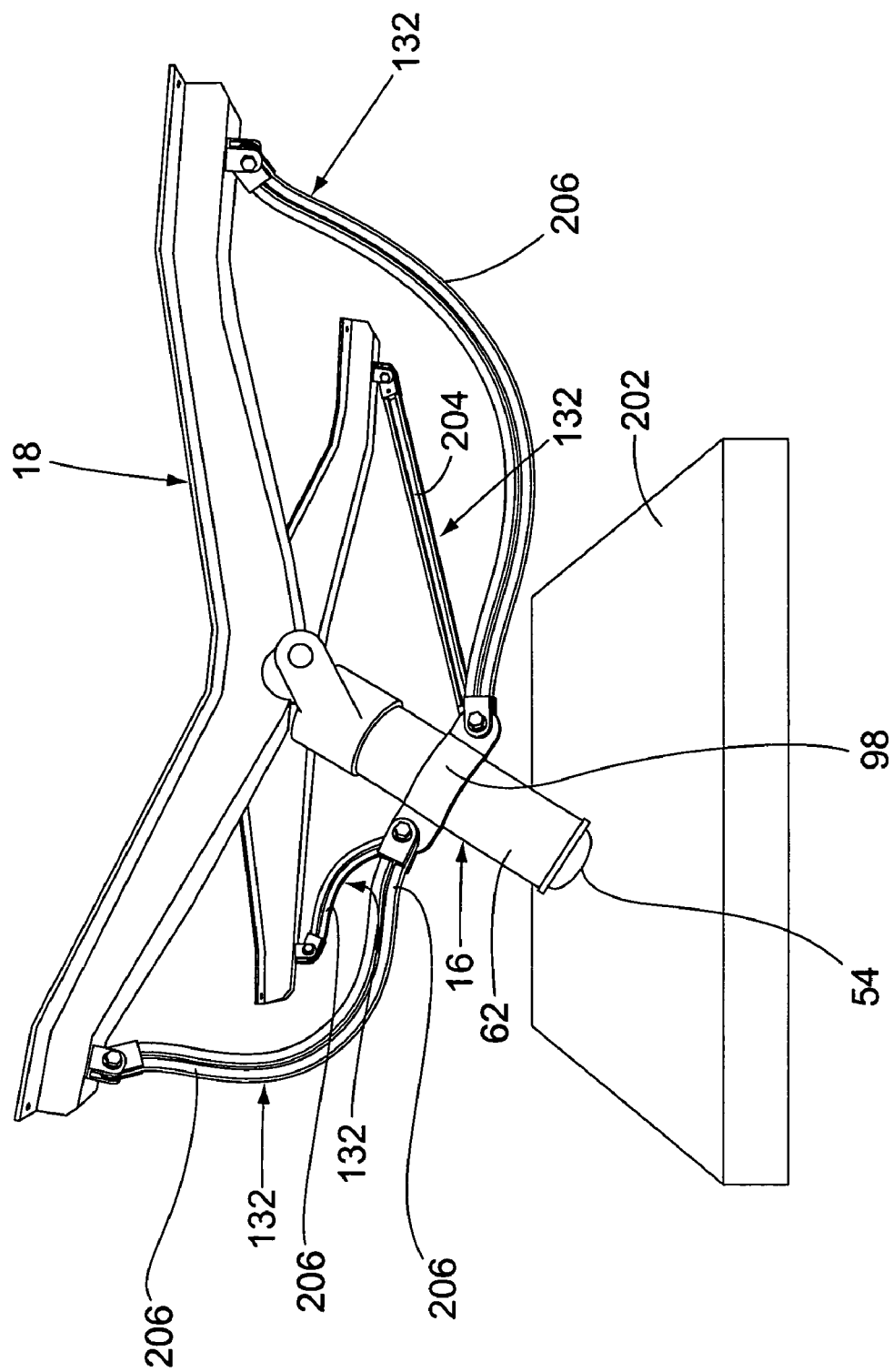
FIG. 28 is a side view of the operation of the apparatus similar to that of FIG. 27, but showing the operation of the alternate stabilizing struts.

FIG. 28 shows a view similar to that of FIG. 27, but showing the link struts 204, 206 of FIG. 27 replaced with the flexible band struts 208 described earlier as the alternative embodiment struts.

The aircraft landing assist apparatus described above is specifically designed to be retrofit to existing aircraft that have not previously been designed for shipboard landings. On rough landings of the aircraft using the apparatus, the apparatus is designed to collapse in a predetermined manner, thereby avoiding any damage to ammunition and/or fuel storage areas of the aircraft.

Although the apparatus of the present disclosure has been described above by reference to specific embodiments, it should be understood that modifications and variations may be made to the apparatus without departing from the intended scope of protection provided by the following claims.

The invention claimed is:

1. A method of installing an aircraft landing assist apparatus on an aircraft, the method comprising:
    structurally reinforcing a load bearing forward bulkhead wall and a load bearing rearward bulkhead wall of the aircraft fuselage; and
    attaching a landing assist apparatus to the aircraft, with the landing assist apparatus being connected to and supported by the reinforced forward and rearward bulkhead walls of the aircraft fuselage.

2. The method of claim 1, further comprising:
    attaching the landing assist apparatus to an underside of the aircraft.

3. The method of claim 1, further comprising:
    positioning the two reinforced bulkheads in the aircraft interior to define a bay area in the aircraft interior between the two bulkheads.

4. The method of claim 3, further comprising:
    positioning an ammunition container inside the aircraft between the two bulkheads.

5. The method of claim 1, further comprising:
    removing one of the existing forward and rearward bulkheads from the aircraft interior construction; and
    adding a reinforced bulkhead in place of the existing bulkhead removed.

6. The method of claim 5, further comprising:
    removing a fuselage panel from the aircraft creating an access opening to an interior of the aircraft; and
    removing the existing bulkhead from the aircraft interior construction through the access opening.

7. The method of claim 6, further comprising:
    reattaching the fuselage panel to the aircraft after removing the existing bulkhead from the aircraft interior construction.

8. The method of claim 6, further comprising:
    reattaching the fuselage panel to the aircraft after removing the existing bulkhead from the aircraft interior construction and adding the reinforced bulkhead to the aircraft interior construction.

9. The method of claim 7, further comprising:
    attaching the landing assist apparatus to the aircraft after reattaching the fuselage panel to the aircraft.

10. The method of claim 5, further comprising:
    removing an ordinance container from the aircraft interior construction.

11. The method of claim 10, further comprising
    removing the existing bulkhead from the aircraft interior construction after removing the ordinance container from the aircraft interior construction.

12. The method of claim 11, further comprising:
    reattaching the ordinance container to the aircraft interior construction after adding the reinforced bulkhead to the aircraft interior construction.

13. The method of claim 10, further comprising:
    removing a fuselage panel from the aircraft creating an access opening to an interior of the aircraft,
    removing the ordinance container from the aircraft interior through the access opening;
    and then removing the existing bulkhead from the aircraft interior through the access opening.

14. The method of claim 13, further comprising:
reattaching the fuselage panel to the aircraft after adding the reinforced bulkhead as to the aircraft interior construction.

15. The method of claim 13, further comprising:
reattaching the fuselage panel to the aircraft prior to attaching the landing assist apparatus to the aircraft.

16. The method of claim 1, further comprising;
removing one of the forward and rearward bulkheads from the aircraft interior construction; and, adding reinforced structural components to the non-removed bulkhead and replacing the removed bulkhead with a structurally reinforced bulkhead.

17. The method of claim 16, further comprising:
connecting the landing assist apparatus to the two reinforced bulkheads.

18. The method of claim 17, further comprising:
positioning the two reinforced bulkheads in the aircraft interior with a spacing between the two reinforced bulkheads that defines an interior bay in the aircraft.

* * * * *